(12) United States Patent
Uchino et al.

(10) Patent No.: US 7,002,624 B1
(45) Date of Patent: Feb. 21, 2006

(54) APPARATUS AND METHOD FOR OBTAINING OBJECT-COLOR COMPONENT DATA

(75) Inventors: Fumiko Uchino, Kyoto (JP); Shiro Usui, Toyohashi (JP); Shigeki Nakauchi, Toyohashi (JP); Keisuke Takebe, Niigata-Ken (JP)

(73) Assignee: Minolta Co., Ltd., Osaka (JP)

( * ) Notice: Subject to any disclaimer, the term of this patent is extended or adjusted under 35 U.S.C. 154(b) by 950 days.

(21) Appl. No.: 09/649,588

(22) Filed: Aug. 29, 2000

(30) Foreign Application Priority Data

Sep. 1, 1999  (JP) ................................ 11-247010

(51) Int. Cl.
*H04N 9/73* (2006.01)
*H04N 5/222* (2006.01)

(52) U.S. Cl. ................................ 348/225.1; 348/223.1; 348/370

(58) Field of Classification Search ............. 348/225.1, 348/224.1, 221.1, 223.1, 362, 370, 371
See application file for complete search history.

(56) References Cited

U.S. PATENT DOCUMENTS

| 5,568,194 A | * | 10/1996 | Abe | ........................ 348/223.1 |
|---|---|---|---|---|
| 5,583,397 A | | 12/1996 | Ogawa | |
| 5,808,681 A | * | 9/1998 | Kitajima | ...................... 348/371 |
| 6,529,235 B1 | * | 3/2003 | Tseng | ...................... 348/223.1 |

FOREIGN PATENT DOCUMENTS

| JP | 7-123423 | 5/1995 |
|---|---|---|
| JP | 8-242459 | 9/1996 |
| JP | 11-25252 | 1/1999 |
| JP | 11-88896 | 3/1999 |
| JP | 11-96333 | 4/1999 |

* cited by examiner

*Primary Examiner*—Aung Moe
(74) *Attorney, Agent, or Firm*—McDermott Will & Emery LLP

(57) ABSTRACT

First image data is obtained by performing an image capturing operation with a flash and, subsequently, second image data is obtained by performing an image capturing operation without a flash. By using data of a differential image between the first and second image data and a relative spectral distribution of flash light, the spectrum reflectivity in a position on a subject corresponding to each pixel is obtained and object-color component data is acquired as data from which an influence of an illumination environment has been removed. On the other hand, illuminant component data indicative of spectral distributions of a plurality of illumination light are prepared. By combining arbitrary illuminant component data to the obtained object-color component data, an image with a different illumination environment can be reproduced.

5 Claims, 26 Drawing Sheets

FIG. 10

```
ILLUMINATION SELECTION MENU
     1. INCANDESCENT LAMP
     2. STANDARD D65 LIGHT SOURCE
     3. DAYTIME SUNLIGHT
     4. CLOUDY SUNLIGHT
     5. FLUORESCENT LAMP 1
     6. FLUORESCENT LAMP 2
SELECTED NUMBER 2
```

FIG. 11

```
ILLUMINATION SELECTION MENU
     1. SUNSET GLOW
     2. STANDARD D65 LIGHT SOURCE
     3. EARLY MORNING
     4. CLOUDY
     5. INSIDE ROOM (FLUORESCENT LAMP 1)
     6. INSIDE ROOM (FLUORESCENT LAMP 2)
SELECTED NUMBER 2
```

F I G. 1 4
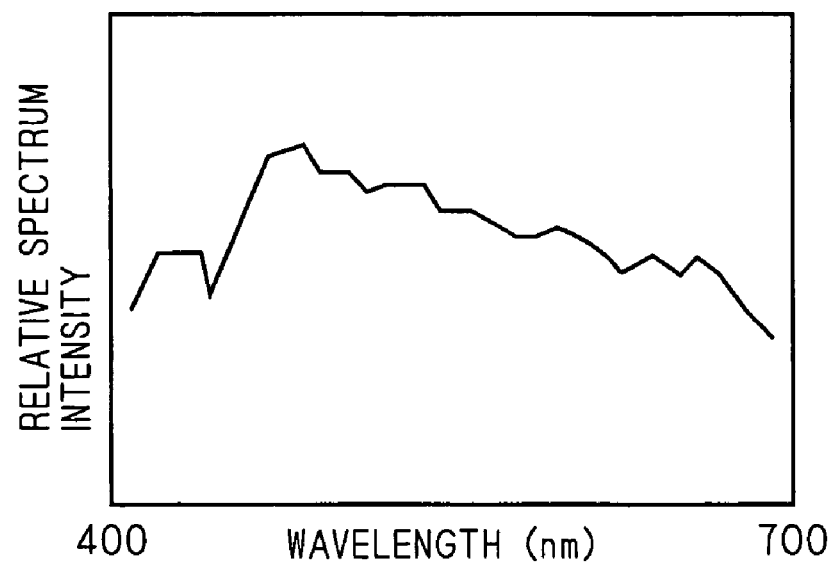

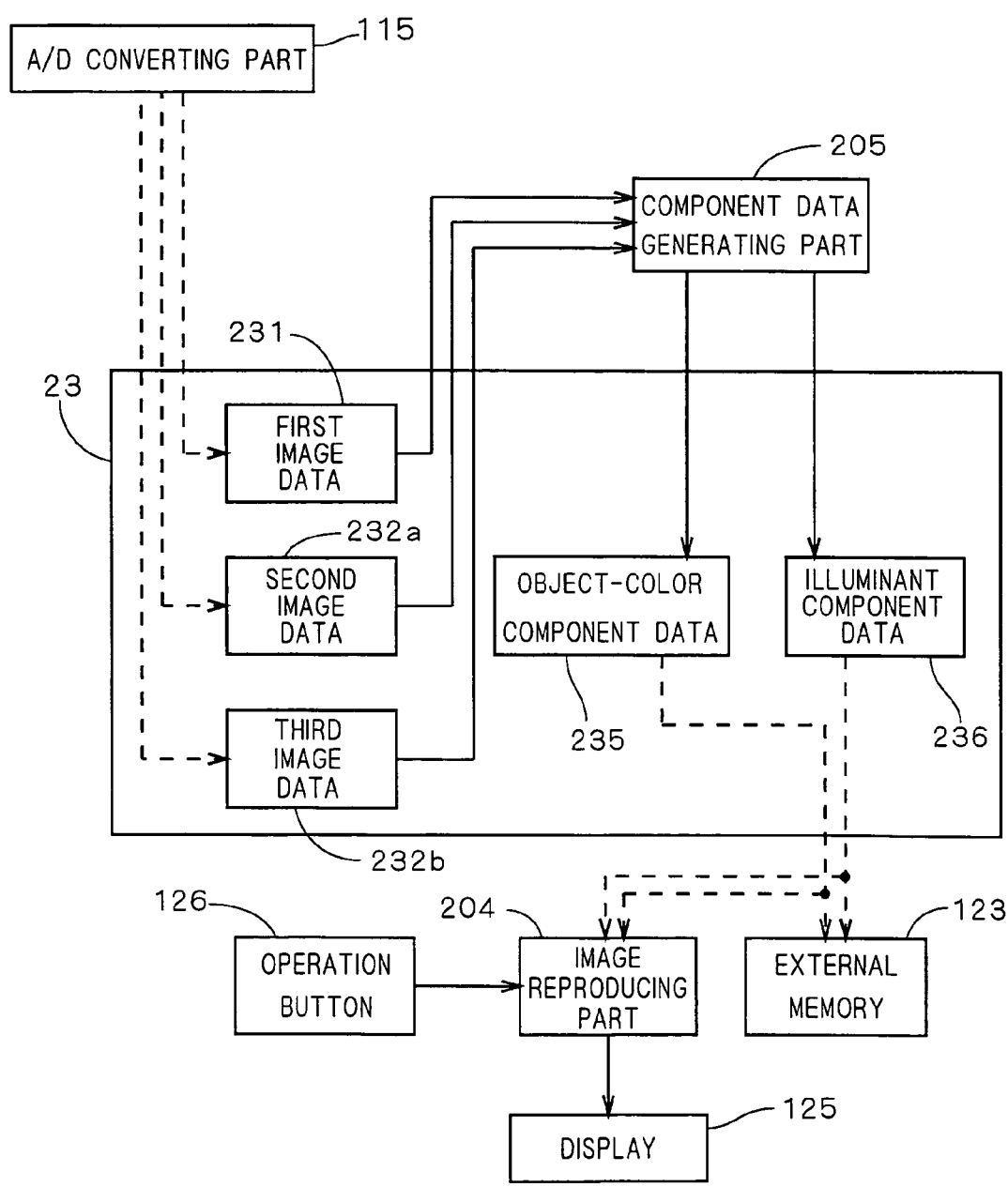
F I G. 22

F I G. 27
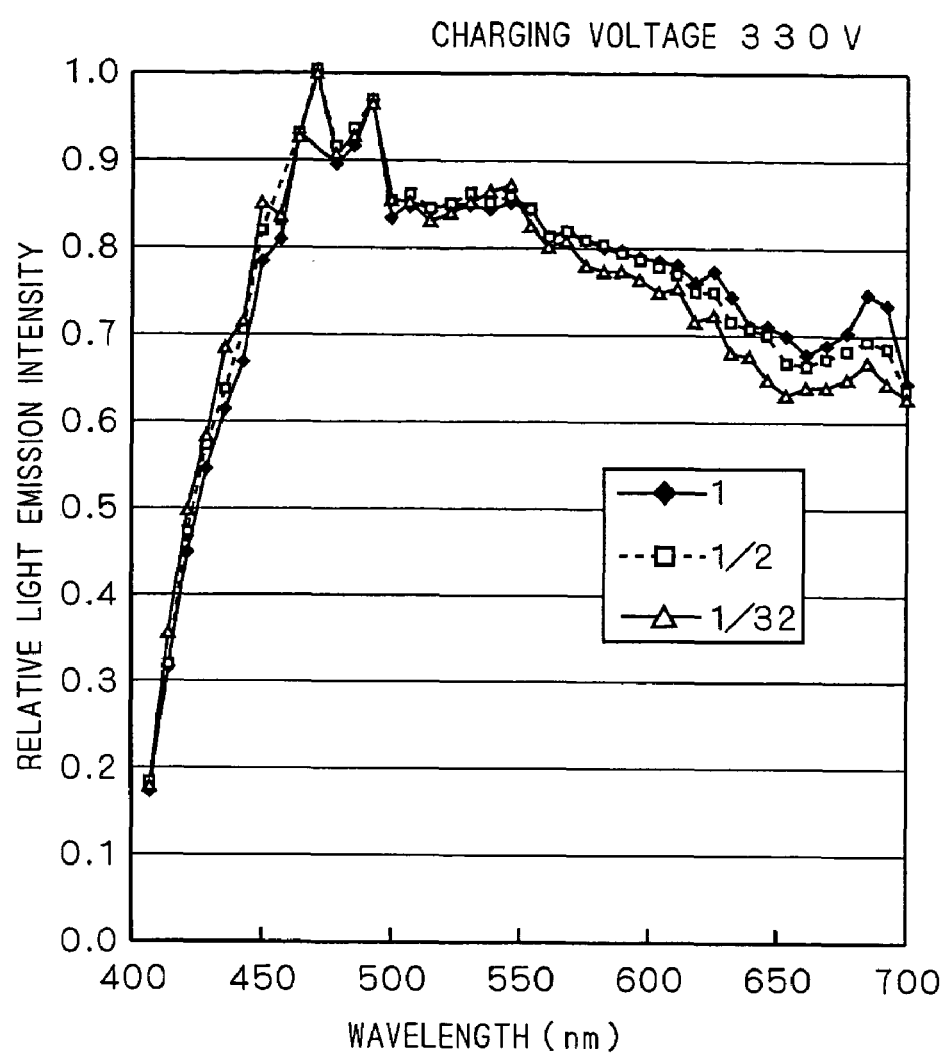

APPARATUS AND METHOD FOR OBTAINING OBJECT-COLOR COMPONENT DATA

This application is based on application No. 11-247010 filed in Japan, the contents of which are hereby incorporated by reference.

BACKGROUND OF THE INVENTION

1. Field of the Invention

The present invention relates to a technique for obtaining image data of a subject and, more particularly, to a technique of obtaining image data by a digital camera or the like.

2. Description of the Background Art

Hitherto, image processes are performed to correct the hue or atmosphere of an image obtained as digital data by an image input device such as a digital camera. A representative one of such processes is a color correction based on white balance. In the correction based on white balance, an image is corrected based on the overall balance of the color of the image so that a white body will appear to be white. This allows the influence of the color of illuminant light on the subject to be removed from the image to some extent, and the image is corrected to one that agrees with the eyesight of human beings.

The conventional correction of the hue of an image is performed uniformly on the entire image. The data of the original image and data related to the correction of the hue are not therefore separately treated. For example, the corrected image is integrally stored as brightness information of RGB.

On the other hand, in some cases, it is desired to correct the hue of an image in order to impart a sense given by the image to an observer to another image. To be specific, in some cases, it is desired to use the atmosphere produced by the illumination environment at the time of capturing an image in an image captured in another illumination environment. The illumination environment is defined here as an environment related to illumination in which not only the characteristics of a light source but also the conditions around the subject are taken into consideration.

Since the data of an image is, however, conventionally treated as integral data, the atmosphere produced by the illumination environment in an image cannot be used by another image. Further, in the case of trying to achieve an environment produced by a specific illumination environment by correcting the hue of the image, an unnatural image is produced only by uniformly changing the hue of the entire image.

SUMMARY OF THE INVENTION

The present invention is directed to a digital image capturing apparatus.

According to an aspect of the present invention, an image capturing apparatus comprises: an illumination unit for changing an illumination environment around a subject; an image capturing part for obtaining an image of the subject; a first memorizing part for memorizing first image data obtained by the image capturing part before illuminating by the illumination unit; a second memorizing part for memorizing second image data obtained by the image capturing part with illuminating by the illumination unit; and a subject data generating part for generating subject data on the basis of the first image data, the second image data, and changing degree of the illumination environment by the illumination unit, the subject data corresponding to image data from which influence of the illumination environment is removed.

In another aspect of the present invention, an image capturing apparatus comprises: an image capturing part for obtaining an image of a subject; at least one filter being capable of existing on an optical path of the image capturing part; a memorizing part for memorizing a plurality of image data obtained by the image capturing part with changing arrangement of the at least one filter; and a subject data generating part for generating subject data on the basis of the plurality of image data memorized in the memorizing part and spectral transmittance of the at least one filter, the subject data corresponding to image data from which influence of an illumination environment is removed.

Since the subject data corresponds to image data from which the influence of an illumination environment is removed, by combining the illumination data corresponding to the influence of the illumination environment exerted on the image and the subject data, data of an image under a desired illumination environment can be generated.

The present invention is also directed to a digital image capturing method, a digital image processing device, and a computer-readable medium carrying a program for processing image data.

These and other objects, features, aspects, and advantages of the present invention will become more apparent from the following detailed description of the present invention when taken in conjunction with the accompanying drawings.

BRIEF DESCRIPTION OF THE DRAWINGS

FIGS. 10 and 11 are views each showing an example of a screen on which a list of sense information is displayed;

FIGS. 12 to 14 are views each showing an example of a spectral distribution of illuminant light represented by the illuminant component data;

FIG. 22 is a block diagram showing the functional construction of the digital camera of FIG. 21;

FIG. 27 is a diagram showing an example of obtaining a relative spectral distribution of flash light by an interpolation;

DESCRIPTION OF THE PREFERRED EMBODIMENTS

1. First Embodiment

Figure 1:
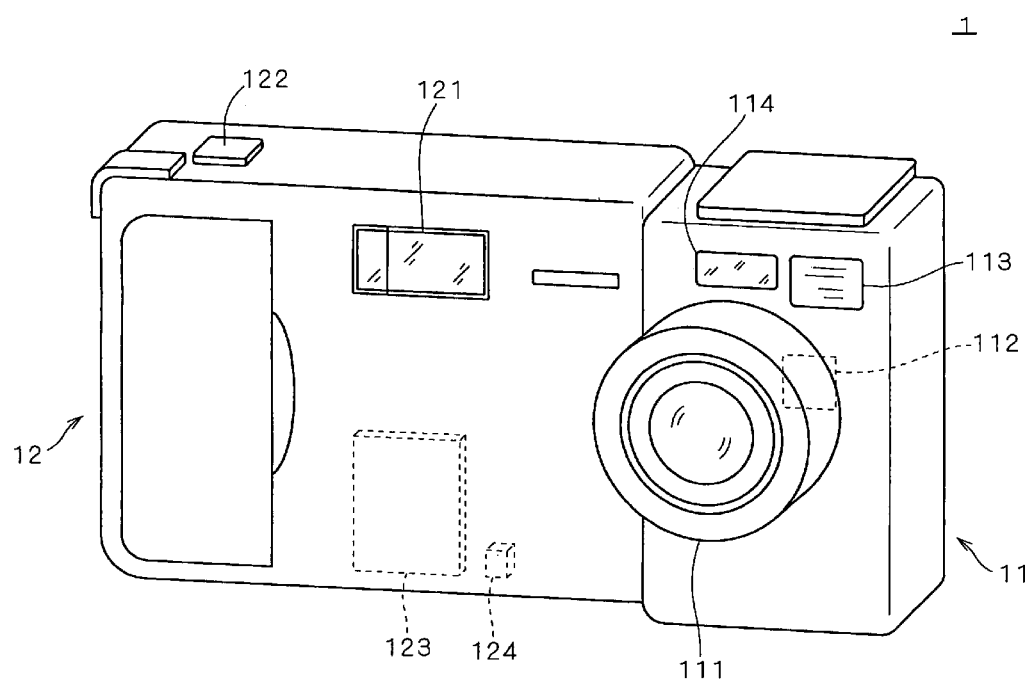
FIG. 1 is a perspective view illustrating a whole digital camera according to a first embodiment.

FIG. 1 is a perspective view showing a whole digital camera 1 as a digital image capturing apparatus according to a first embodiment. The digital camera 1 comprises a lens unit 11 for capturing an image and a main body part 12 for processing an image obtained as digital data by the lens unit 11.

The lens unit 11 has a lens system 111 having a plurality of lenses and a CCD 112 for capturing an image of a subject via the lens system 111. An image signal outputted from the CCD 112 is sent to the main body part 12. In the lens unit 11, a finder 113 used by the operator to capture the subject, a range sensor 114, and the like are also arranged.

In the main body part 12, a flash 121 and a shutter button 122 are provided. When the operator captures the subject via the finder 113 and operates the shutter button 122, an image is obtained electrically by the CCD 112. At this time, the flash 121 is used in accordance with necessity. The CCD 112 is 3-band image capturing means for obtaining values related to each of the colors of R, G and B as values of each pixel.

An image signal from the CCD 112 is subjected to processes which will be described hereinlater in the main body part 12 and a resultant signal is stored into an external memory 123 (what is called a memory card) attached to the main body part 12 as necessary. The external memory 123 is ejected from the main body part 12 by opening a lid on the under face of the main body part 12 and operating an ejection button 124. Data stored in the external memory 123 as a recording medium can be transferred to a device such as a computer separately provided. On the contrary, the digital camera 1 can read the data stored in the external memory 123 by another device.

Figure 2:
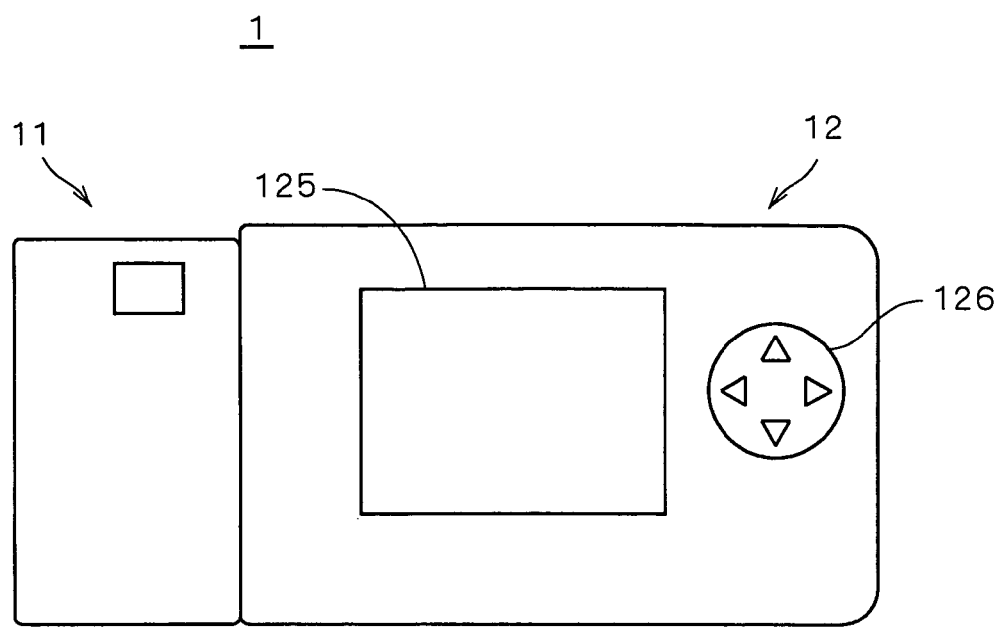
FIG. 2 is a rear view of the digital camera shown in FIG. 1.

FIG. 2 is a rear view of the digital camera 1. In the center of the rear face of the main body part 12, a liquid crystal display 125 for displaying a captured image or a menu for the operator is provided. An operation button 126 for performing an input operation in accordance with the menu displayed on the display 125 is disposed on a side of the display 125. By the operation button 126, operation of the digital camera 1, setting of image capturing conditions, control of the external memory 123, reproduction of an image which will be described hereinafter, and the like can be performed.

Figure 3:
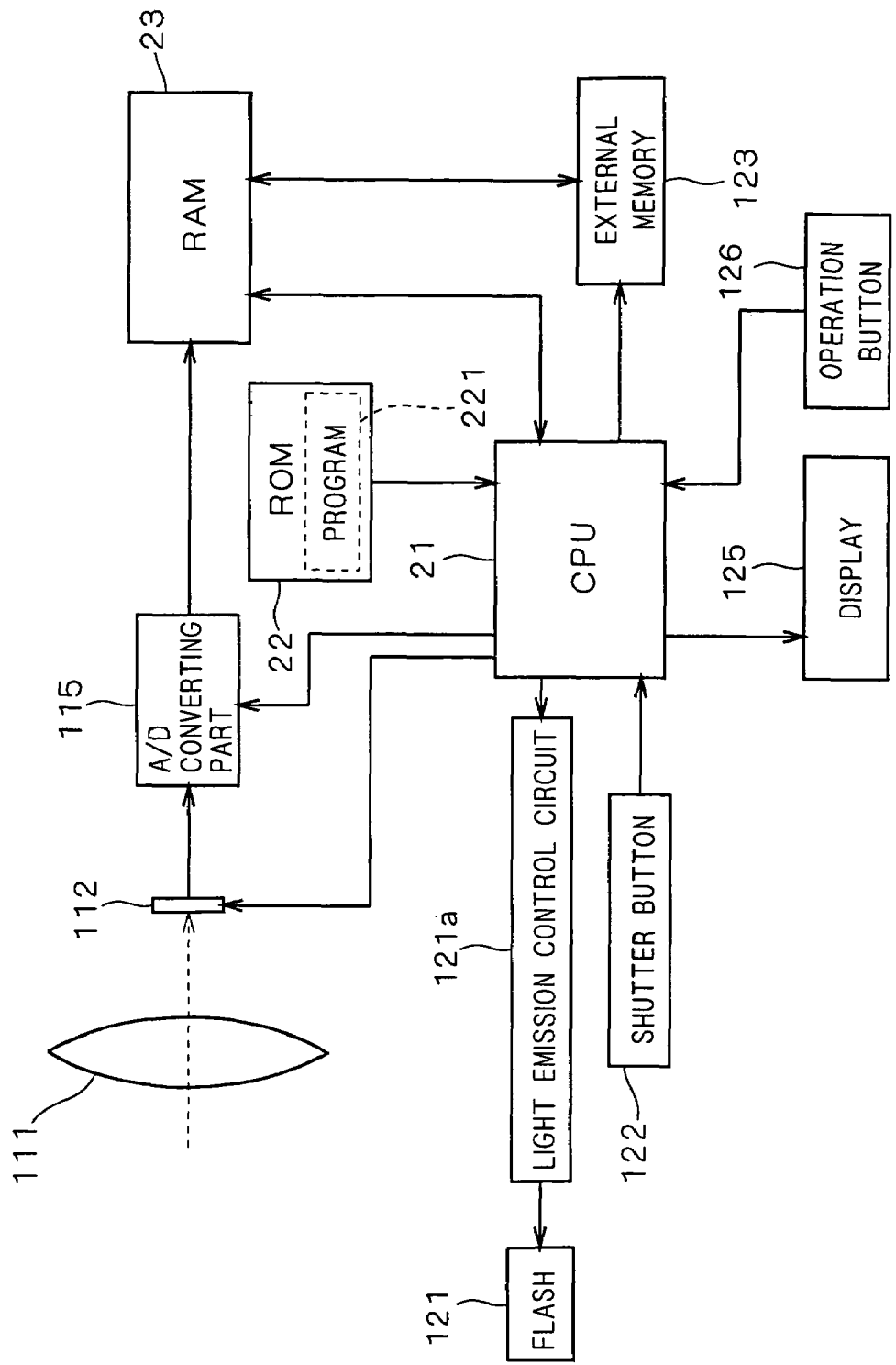
FIG. 3 is a block diagram showing the construction for executing an image process in the digital camera illustrated in FIG. 1.

FIG. 3 is a block diagram schematically showing a construction for mainly executing an image process in the construction of the digital camera 1.

In the construction shown in FIG. 3, the lens system 111, the CCD 112, an A/D converting part 115, the shutter button 122, a CPU 21, a ROM 22 and a RAM 23 realize a function of obtaining an image. Specifically, when an image of a subject is formed on the CCD 112 by the lens system 111 and the shutter button 122 is pressed, an image signal from the CCD 112 is converted into a digital signal by the A/D converting part 115. The digital image signal obtained by the A/D converting part 115 is stored as image data into the RAM 23 of the main body part 12. The control of these processes is carried out by the CPU 21 operating in accordance with a program 221 stored in the ROM 22.

The CPU 21, the ROM 22 and the RAM 23 disposed in the main body part 12 realize a function of processing an image. Specifically, the CPU 21 performs an image process on the obtained image in accordance with the program 221 stored in the ROM 22 while utilizing the RAM 23 as a work area.

The external memory 123 is connected to the RAM 23 and various data is transferred on the basis of an input operation by the operation button 126. The display 125 switches and displays an image and information to the operator in response to a signal from the CPU 21.

The flash 121 is connected to the CPU 21 via a light emission control circuit 121a. When an instruction of turning on the flash 121 is received from the CPU 21, the light emission control circuit 121a performs a control to suppress variations in the light emitting characteristic of the flash 121 in image capturing operations, so that a spectral distribution (spectral intensity) of light from the flash 121 is controlled to be uniform.

Figure 4:
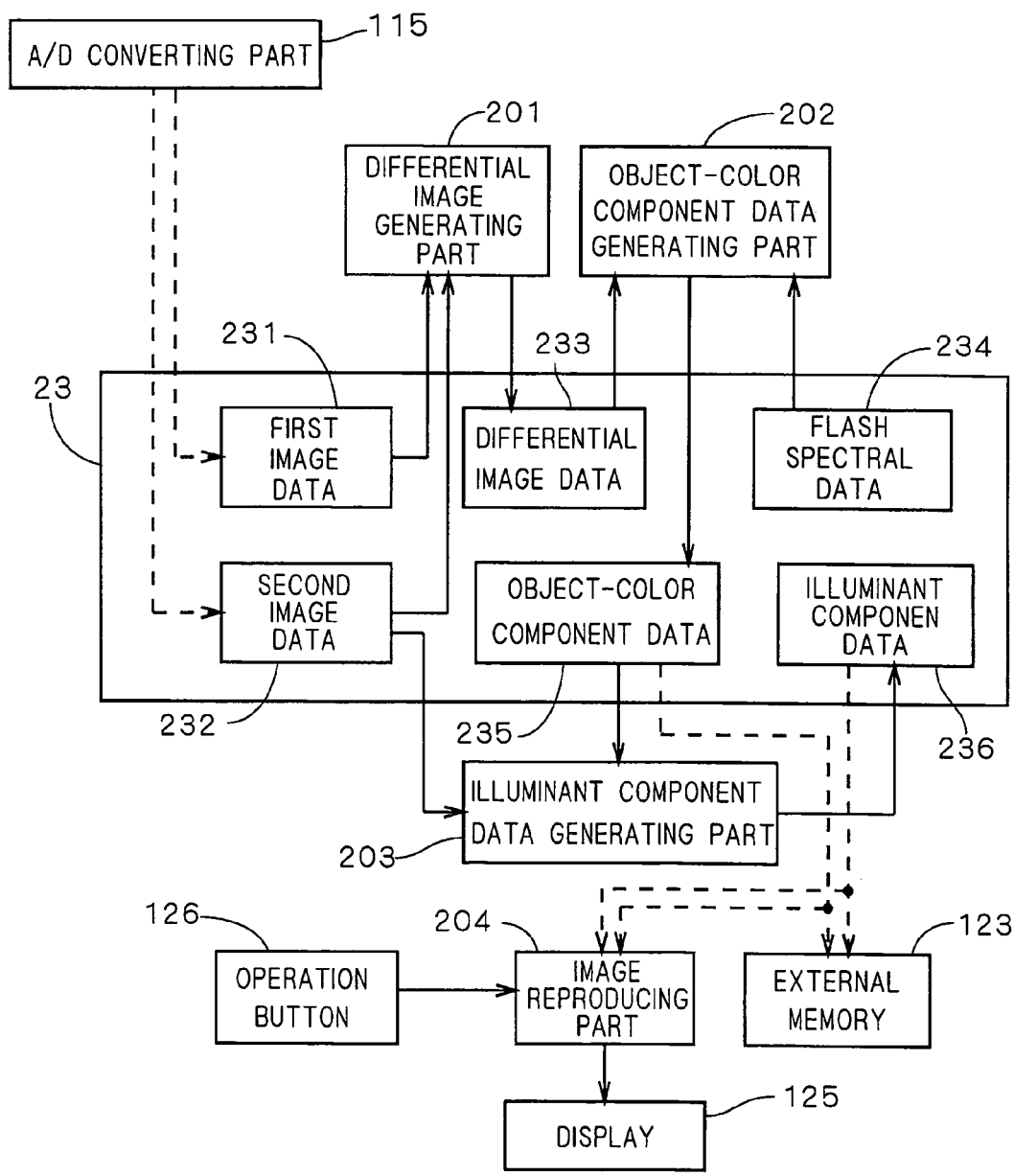
FIG. 4 is a block diagram showing the functions of the construction of FIG. 3.
Figure 5:
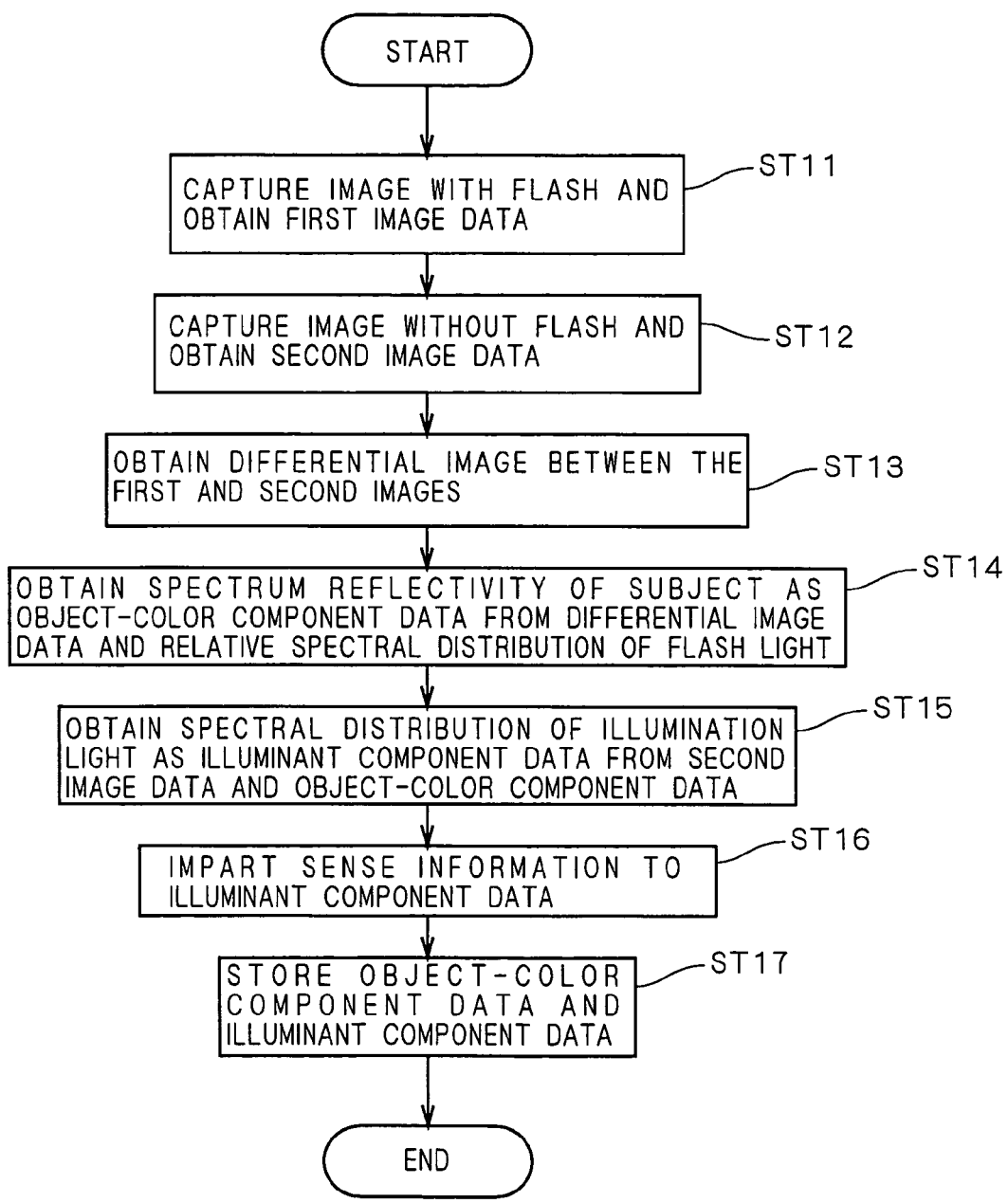
FIG. 5 is a flow chart showing a flow of operations for obtaining image data in the digital camera illustrated in FIG. 1.

FIG. 4 is a block diagram showing a construction of functions realized mainly by the CPU 21, the ROM 22 and the RAM 23 together with the other construction. FIG. 5 is a flowchart showing a flow of image capturing and image processes. In the construction shown in FIG. 4, a differential image generating part 201, an object-color component data generating part 202, an illuminant component data generating part 203 and an image reproducing part 204 are the functions realized by the CPU 21, the ROM 22, the RAM 23 and the like. The operation of the digital camera 1 will be described hereinbelow with reference to the drawings.

First, image capturing is performed with the flash and an image of the subject irradiated with the flash light is obtained (hereinbelow, called a "first image"). To be specific, an image is obtained with the flash 121 by the CCD 112, the obtained image (accurately, an image signal) is sent from the A/D converting part 115 to the RAM 23 and is stored as first image data 231 (step ST11).

Then, image capturing is performed without the flash and an image of the subject under an illumination environment without using the flash light (hereinbelow, called a "second image") is obtained. In other words, an image is obtained by the CCD 112 without using the flash, and the obtained image is sent from the A/D converting part 115 to the RAM 23 and stored as second image data 232 (step ST12).

The image capturing operations of twice are performed quickly successively. The first and second images are therefore captured in the same image capturing range. The image capturing operations of twice are performed under the same conditions of the shutter speed (integration time of the CCD 112) and the aperture.

Figure 6:
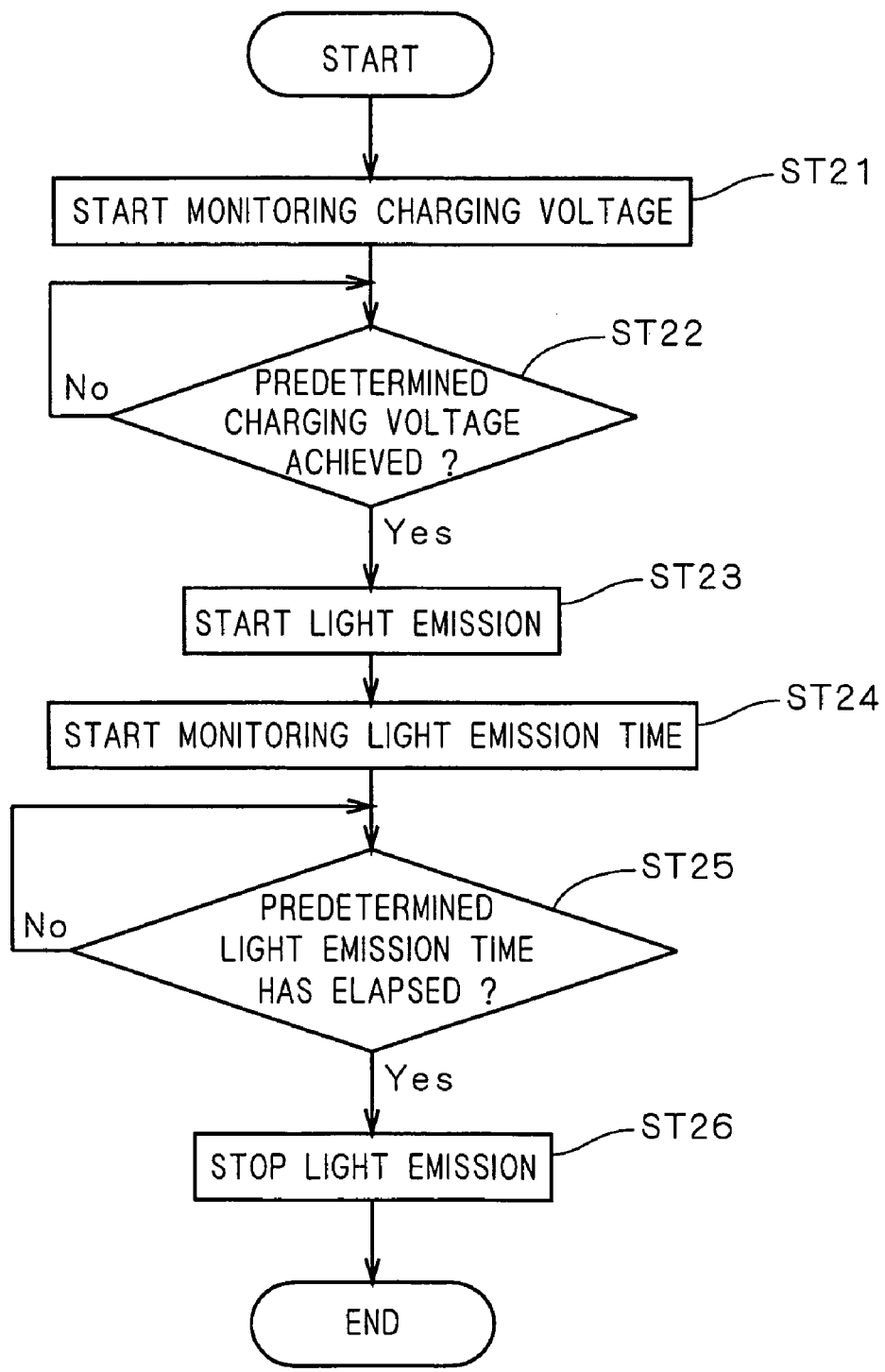
FIG. 6 is a flow chart showing a flow of operations of a light emission control circuit.

The light emission of the flash 121 is controlled by the light emission control circuit 121*a* so that the spectral distribution of flash light becomes uniform. FIG. 6 is a flow chart showing the flow of operations of the light emission control circuit 121*a*.

When image capturing is performed with the flash, or prior to image capturing, first, the light emission control circuit 121*a* starts monitoring a charging voltage to the power source of the flash 121 (that is, a voltage applied to the flash 121) (step ST21). When it is recognized that the charging voltage reaches a predetermined voltage (for example, 330V) (step ST22), a power is supplied from the power source to the flash 121 and light emission is started (step ST23).

Upon start of the light emission, the light emission control circuit 121*a* starts monitoring light emission time (step ST24). After that, when it is confirmed that predetermined time has elapsed since the start of light emission (step ST25), the light emission is stopped (step ST26).

As described above, the light emission of the flash 121 is controlled by a constant voltage and light emission time, so that the light emission characteristic does not vary in image capturing operations. The spectral distribution of the flash 121 is kept to be uniform by the light emission control, preliminarily measured and stored as flash spectral data 234 in the RAM 23. To be accurate, a relative spectral distribution of flash light (spectral distribution normalized by setting the maximum spectral intensity to 1 and will be called hereinbelow a "relative spectral distribution") is used as the flash spectral data 234.

After the first image data 231 and the second image data 232 is stored into the RAM 23 by the image capturing operations of twice, the differential image generating part 201 subtracts the second image data 232 from the first image data 231 to thereby obtain differential image data 233. By the operation, the values of R, G and B of each pixel in the second image are subtracted from the values of R, G and B of a corresponding pixel in the first image, so that a differential image between the first and second images is obtained (step S13).

Then, components obtained by removing the influence of the illumination environment from the second image by using the differential image data 233 and the flash spectral data 234 are obtained as object-color component data 235 by the object-color component data generating part 202 and stored into the RAM 23 (step ST14). The object-color component data 235 is data substantially corresponding to the spectral reflectivity of the subject. The principal of obtaining the spectral reflectivity of the subject will be explained hereinbelow.

First, a spectral distribution of illumination light (illumination light under illumination environment including both direct light from a light source and indirect light) for illuminating the subject is set as $E(\lambda)$ and the spectral distribution $E(\lambda)$ is expressed as follows by using three basis functions $E_1(\lambda)$, $E_2(\lambda)$ and $E_3(\lambda)$ and weighting coefficients $\epsilon_1$, $\epsilon_2$, and $\epsilon_3$.

$$E(\lambda) = \sum_{i=1}^{3} \varepsilon_i E_i(\lambda) \qquad (1)$$

Similarly, the spectral reflectivity $S(\lambda)$ in a position on the subject corresponding to a pixel (hereinbelow, called a "target pixel") is expressed as follows by using three basis functions $S_1(\lambda)$, $S_2(\lambda)$ and $S_3(\lambda)$ and weighting coefficients $\sigma_1$, $\sigma_2$ and $\sigma_3$.

$$S(\lambda) = \sum_{j=1}^{3} \sigma_j S_j(\lambda) \qquad (2)$$

Light $I(\lambda)$ incident on the target pixel on the CCD 112 (incident light in the case of ignoring a filter and the like in the lens unit 11) is expressed as follows.

$$I(\lambda) = \sum_{i=1}^{3} \varepsilon_i E_i(\lambda) \cdot \sum_{j=1}^{3} \sigma_j S_j(\lambda) \qquad (3)$$

When a value related to one of the colors R, G and B of the target pixel (hereinbelow, called a "target color") is set as $\rho_c$ and the spectral sensitivity of the target color on the CCD 112 is $R_c(\lambda)$, the value $\rho_c$ is derived from the following equation.

$$\rho_c = \int R_c(\lambda) I(\lambda) d\lambda \qquad (4)$$

In the case where the value of the target color of the target pixel in the first image captured with the flash is $\rho_{c1}$ and the corresponding value in the second image captured without the flash is $\rho_{c2}$, the corresponding value $\rho_s$ in the differential image is obtained by the following equation.

$$\begin{aligned}
\rho_s &= \rho_{c1} - \rho_{c2} \\
&= \int R_c(\lambda)\{I_1(\lambda) - I_2(\lambda)\} d\lambda \\
&= \int R_c(\lambda) \left\{ \sum_{i=1}^{3} (\varepsilon_{1i} - \varepsilon_{2i}) E_i(\lambda) \cdot \sum_{j=1}^{3} \sigma_j S_j(\lambda) \right\} d\lambda \\
&= \sum_{i=1}^{3} \sum_{j=1}^{3} \varepsilon_{si} \sigma_j \left\{ \int R_c(\lambda) E_i(\lambda) S_j(\lambda) d\lambda \right\}
\end{aligned} \qquad (5)$$

where, $I_1(\lambda)$ denotes light incident on the target pixel in the case where the flash is used, $\epsilon_{11}$, $\epsilon_{12}$ and $\epsilon_{13}$ are weighting coefficients of basis functions related to illumination light including flash light, similarly, $I_2(\lambda)$ denotes light incident on the target pixel in the case where no flash is used, and $\epsilon_{21}$, $\epsilon_{22}$ and $\epsilon_{23}$ are weighting coefficients of basis functions related to illumination light which does not include flash light. $\epsilon_{si}$ (i=1, 2, 3) is equal to ($\epsilon_{1i} - \epsilon_{2i}$).

In the equation 5, the basis functions $E_i(\lambda)$ and $S_j(\lambda)$ are predetermined functions and a spectral sensitivity $R_c(\lambda)$ is a function which can be preliminarily obtained by measurement. The information is prestored in the ROM 22 and the RAM 23. On the other hand, since the shutter speed (or integration time of the CCD 112) and the aperture are controlled to be the same in the image capturing operations of twice, the differential image obtained by subtracting the second image from the first image corresponds to an image influenced by only the illumination environment, that is, an image irradiated with only the flash light as illumination light. Consequently, the weighting coefficient $\epsilon_{si}$ can be derived from the relative spectral distribution of flash light by a method which will be described hereinlater.

In the equation 5, therefore, only the three weighting coefficients $\sigma_1$, $\sigma_2$ and $\sigma_3$ are unknown. The equation 5 can be obtained with respect to each of the three colors R, G and B in a target pixel. By solving the three equations, the three weighting coefficients $\sigma_1$, $\sigma_2$ and $\sigma_3$ can be obtained. That is, the spectrum reflectivity in a position on the subject corresponding to the target pixel can be obtained.

The method of obtaining the weighting coefficient $\epsilon_{si}$ will now be described. As described above, the differential image corresponds to an image irradiated with only flash light as illumination light and the relative spectral distribution of illumination light in the differential image is known. On the other hand, the subject in an area far from the flash 121 is irradiated with less flash light than that in an area near the flash 121. The further the area from the flash 121 is, therefore, the darker the differential image becomes.

While maintaining the relative relation of the three weighting coefficients $\epsilon_{s1}$, $\epsilon_{s2}$ and $\epsilon_{s3}$, the values of the weighting coefficients increase or decrease in proportional to the brightness of the target pixel in the differential image. That is, when the brightness of the target pixel in the differential image is low, the weighting coefficients $\epsilon_{s1}$, $\epsilon_{s2}$ and $\epsilon_{s3}$ are determined as small values. When the brightness is high, the weighting coefficients $\epsilon_{s1}$, $\epsilon_{s2}$ and $\epsilon_{s3}$ are determined as large values. The relative relation of the three weighting coefficients $\epsilon_{s1}$, $\epsilon_{s2}$ and $\epsilon_{s3}$ is preliminarily obtained so that the total weight of the three basis functions $E_1(\lambda)$, $E_2(\lambda)$ and $E_3(\lambda)$ is proportional to the spectral distribution of flash light. The proportional relation between the brightness and the weighting coefficient $\epsilon_{si}$ is preliminarily obtained by measurement.

The weighting coefficient $\epsilon_{si}$ is a value indicative of the spectral distribution of coefficients $\epsilon_{21}$, $\epsilon_{22}$, and $\epsilon_{23}$ are calculated and the obtained three weighting coefficients are used as the illumination component data 236 (step ST15). Thus, the illumination component data 236 becomes values which does not depend on the position of a pixel. By combining the illumination component data 236 with the other object-color component data 235 as will be described hereinlater, the atmosphere of the illumination environment can be brought into an image of another subject.

Figure 7:
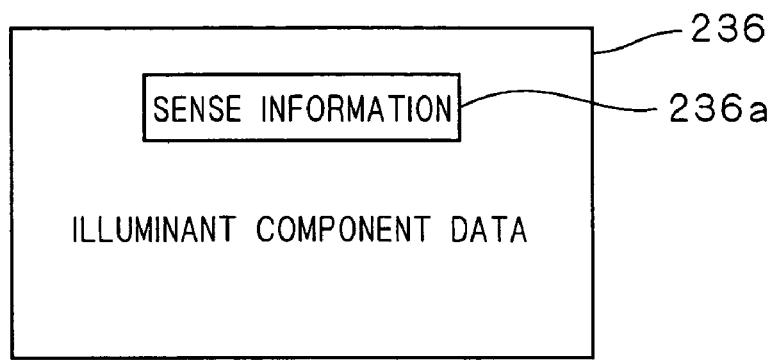
FIGS. 7 and 8 are schematic diagrams showing the relation between illuminant component data and sense information.
Figure 8:
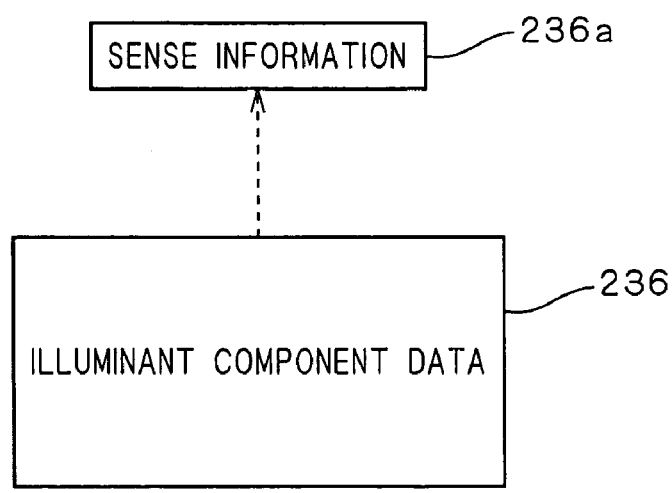

Before the illumination component data 236 is stored, information indicative of the sense (hereinbelow, called "sense information") is added to the illumination component data 236 on the basis of an input of the operator via the operation button 126 (step ST16). Specifically, sense information 236a is imparted to the illumination component data 236 as shown in FIG. 7 or related to the illumination component data 236 as shown in FIG. 8. As described above, the illumination component data 236 is data indicative of an influence of the illumination environment in an image. An image reproduced by an operation which will be described hereinlater by using the illumination component data 236 gives a certain kind of impression to the observer. In the digital camera 1, the illuminant component data 236 is stored in a recognizable state by using information indicating the impression (feeling) of the observer.

Specifically, information such as a word indicating the sense of a season such as "spring-like" or "midsummer", a word indicating the sense of time such as "evening glow", "early morning" or "early afternoon", a word indicating the sense of temperature such as "chilly" or "glowing hot", or a word indicating the sense of weather such as "foggy" or "cloudy" is imparted to the illuminant component data 236 and the resultant is stored.

When the object-color component data 235 and the illuminant component data 236 are obtained, the data is transferred and stored into the external memory 123 which is the flash light emitted to a position on the subject corresponding to the target pixel and also indicative of the spectral distribution of an amount of a change of the illumination light by the flash 121 between the first and second images. A process of obtaining the weighting coefficient $\epsilon_{si}$ from the flash spectral data 234, therefore, corresponds to a process of obtaining a degree of a change in spectrum of the illumination environment (illumination light) with the flash 121 from the relative spectral distribution of the flash light.

On the basis of the principle, the object-color component data generating part 202 in the digital camera 1 obtains the spectrum reflectivity in a position on the subject corresponding to each pixel with reference to the pixel value of the differential image data 233 and the flash spectral data 234. The spectral reflectivity of the subject corresponds to image data from which the influence of the illumination environment is removed and is stored as the object-color component data 235 into the RAM 23 (step ST14).

When the object-color component data 235 is obtained, three equations related to weighting coefficients $\epsilon_{21}$, $\epsilon_{22}$ and $\epsilon_{23}$ can be obtained on the basis of the values of R, G and B of each pixel in the second image by the equations 3 and 4. In the illumination component data generating part 203, the weighting coefficient $\epsilon_{2i}$ related to each pixel in the second image is obtained by solving the equations. The obtained weighting coefficient $\epsilon_{2i}$ of each pixel is a component indicative of the influence of the illumination environment without the flash light in the second image.

The weighting coefficient $\epsilon_{2i}$ of each pixel may be used as illumination component data 236. In the case of an illumination environment of almost even illumination light, the weighting coefficients $\epsilon_{2i}$ of pixels do not vary so much. Consequently, average values of all of pixels with respect to each of the weighting detachable from the main body of the digital camera 1 (step ST17). The object-color component data 235 and/or the illumination component data 236 may be stored in the external memory 123 in a state where each data can be read independently.

The operation of the digital camera 1 when an image is reproduced by using the object-color component data 235 and the illumination component data 236 stored in the external memory 123 as described above will be explained by referring to FIG. 9. It is assumed that a plurality of object-color component data 235 and a plurality of illuminant component data 236 are prestored in the external memory 123. The plurality of object-color component data 235 and the plurality of illuminant component data 236 may be stored in the external memory 123 from an external computer.

First, the operator gives an instruction via the operation button 126 while watching the contents on the display 125 to thereby read desired object-color component data 235 from the external memory 123 and write it to the RAM 23

(step ST31). By the operation, an object of an image to be reproduced (that is, the subject at the time of image capturing) is determined.

The sense information 236a imparted to each of the illuminant component data 236 stored in the external memory 123 is read out and a list of a plurality of pieces of sense information 236a is displayed on the display 125 (step ST32). The illuminant component data 236 as candidates to be selected in the external memory 126 becomes selectable on the basis of the sense information 236a. FIGS. 10 and 11 are diagrams of examples of display screens of sense information of the display 125 in the case where light sources are shown and in the case where light sources are not shown, respectively.

Figure 12:
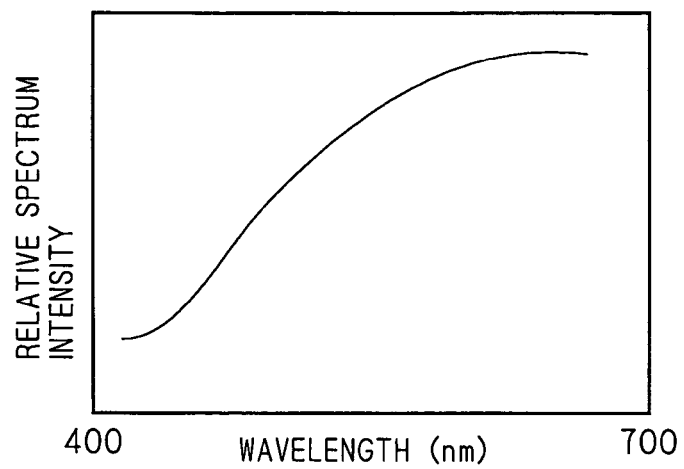
Figure 13:
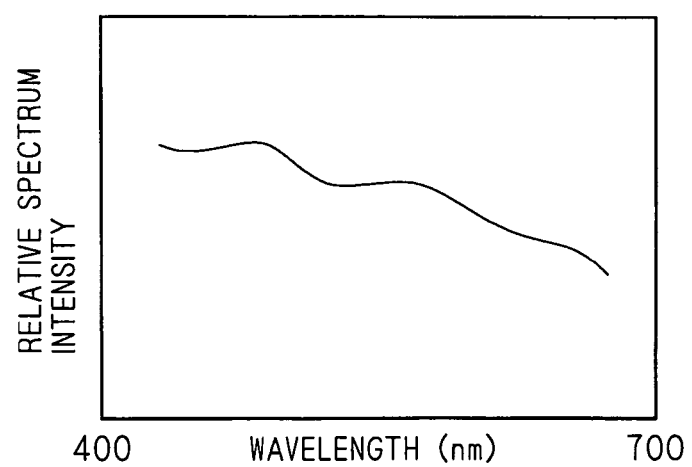

FIGS. 12 to 14 are diagrams each showing an example of a spectral distribution of illumination light common to each pixels expressed by three weighting coefficients of the illumination component data 236 and predetermined three basis functions in terms of relative spectrum intensity. As the sense information, a word such as "evening glow" is given to FIG. 12, a word such as "chilly" is given to FIG. 13, and a word such as "early afternoon" is given to FIG. 14. Obviously, it is unnecessary to give information indicating the sense to all the illuminant component data 236 but a word such as "fluorescent lamp" may be imparted. The sense information is not limited to words but may be a color, a sound or the like.

The operator designates sense information from the list of the sense information 236a by using the operation button 126. On receipt of the designation of the operator, the image reproducing part 204 determines the illuminant component data 236 to which the designated sense information 236a is imparted as illuminant component data to be used for reproduction (step ST33), reads the illuminant component data 236 from the external memory 123 and stores it into the RAM 23 (step ST34).

In the case of reproducing an image as the base of the object-color component data 235 which has been already stored, the illuminant component data 236 at the time when the object-color component data 235 is obtained is stored into the RAM 23. In the case of reproducing the image as an image under the illumination environment of another image, the illuminant component data 236 obtained when the another image is captured is stored into the RAM 23.

After that, the object-color component data 235 and the illuminant component data 236 are combined by the image reproducing part 204 by arithmetic operations shown in the equations 3 and 4, thereby obtaining values $\rho_r$, $\rho_g$ and $\rho_b$ of R, G and B of each pixel, and image data as an object is generated (step ST35). The obtained image data is displayed on the display 125 provided on the rear face of the digital camera 1 (step ST36).

The reproduced image is stored in the external memory 123 in a regular image format as necessary (which may be compressed).

As described above, the digital camera 1 can obtain the object-color component data 235 corresponding to image data from which the influence of the illumination environment is removed from the first image captured with the flash, the second image captured without the flash, and the relative spectral distribution of flash light. That is, the object-color component data 235 indicative of the spectrum reflectivity of the object can be easily derived from two images obtained under different illumination environments. The illumination environment can be easily changed by using the flash 121.

Also, the digital camera 1 capable of obtaining the object-color component data 235 by a simple change in the specification of the digital camera having a CCD provided with a general on-chip filter can be realized without having a special mechanism. Consequently, the operation of obtaining the object-color component data 235 can be realized as a special mode of the general digital camera 1 without increasing the manufacturing cost.

In the digital camera 1, the illuminant component data 236 is obtained from the derived object-color component data 235 and the second image data. In the digital camera 1, therefore, by properly combining the selected one of the plurality of illuminant component data 236 to the object-color component data 235, a desired image under a desired illumination environment can be reproduced. That is, in the case of reproducing an image in an atmosphere at the time when the image is captured, it is sufficient to combine the object-color component data 235 and the illuminant component data 236 generated as a pair. In the case of reproducing an image by using the illumination environment of another image, the illuminant component data 236 obtained under another illumination environment is combined to the object-color component data 235, thereby reproducing an image under another illumination environment.

The image data as a base of obtaining the illumination component data 236 is not limited to the second image data but may be the first image data. Further, image data captured by using the same object separately may be used.

By providing standard light (D65 or the like) as the illuminant component data 236 as exemplified in FIG. 10, an image obtained under an arbitrary illumination environment is reproduced by using data of the standard light and accurate color reproduction of the subject can be made from the obtained image. Consequently, an image suitable for printing, Internet shopping and the like can be generated.

Further, in the digital camera 1, the sense information 236a is imparted to the illumination component data 236 and the operator can select the illumination component data 236 on the basis of the sense information 236a, so that reproduction of an image based on sense can be enjoyed.

It has been described above that the weighting coefficients $\sigma_1$, $\sigma_2$ and $\sigma_3$ corresponding to pixels are stored as the object-color component data 235 and the weighting coefficients $\epsilon_1$, $\epsilon_2$ and $\epsilon_3$ common to the pixels (peculiar to pixels in the case where general versatility is not demanded) are stored as the illuminant component data 236. They may be stored together with the basis functions $S_1(\lambda)$, $S_2(\lambda)$ and $S_3(\lambda)$ of the spectrum reflectivity of the subject and the basis functions $E_1(\lambda)$, $E_2(\lambda)$ and $E_3(\lambda)$ of the spectral distribution of illumination light.

2. Second Embodiment

Figure 15:
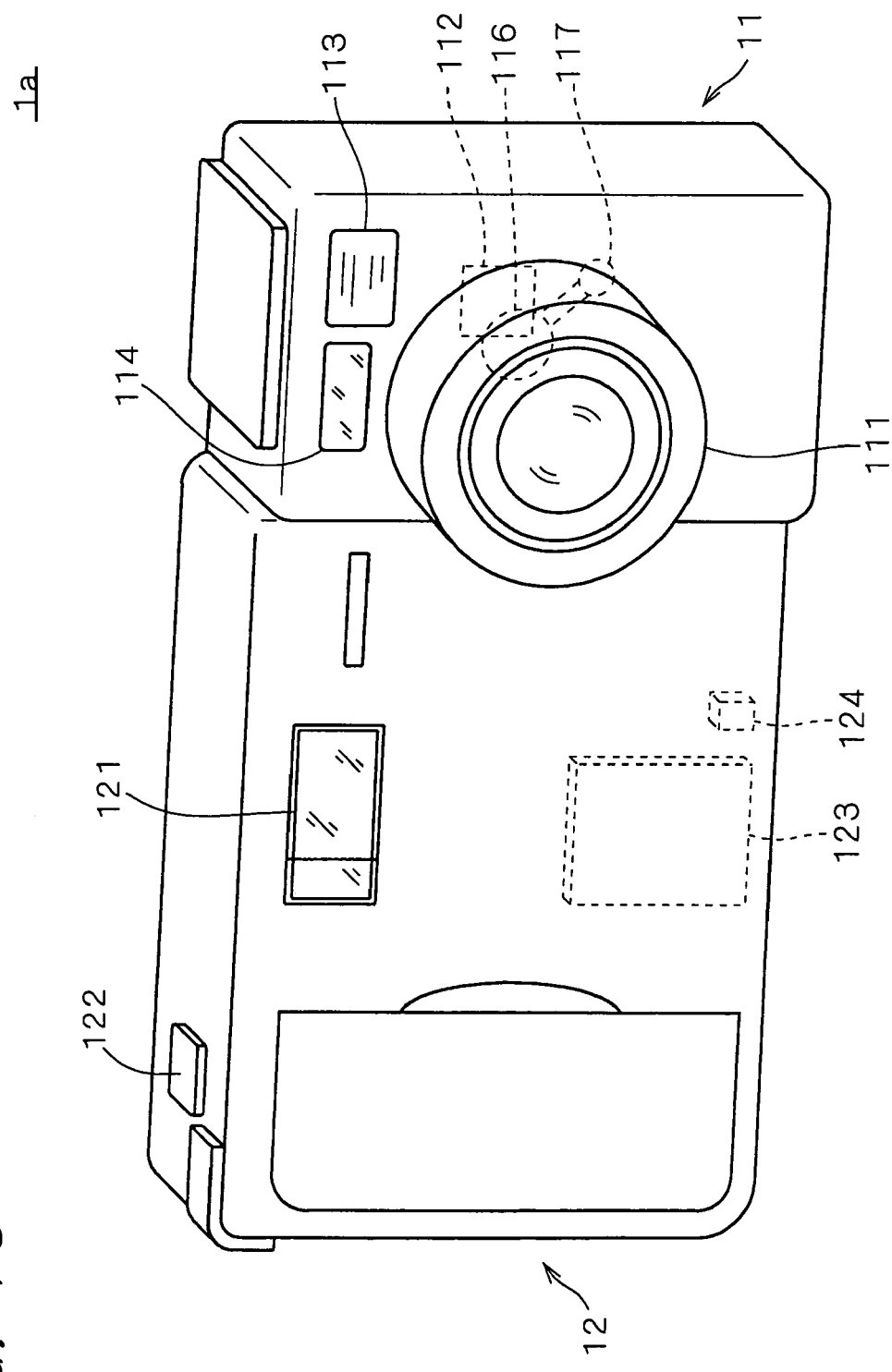
FIG. 15 is a perspective view of a whole digital camera according to a second embodiment.

FIG. 15 is a diagram showing the construction of a digital camera 1a according to a second embodiment. As shown in FIG. 15, the digital camera 1a has a filter 116 in front of the CCD 112 of the digital camera 1 in the first embodiment and the filter 116 is movably disposed by the operation of a motor 117. The other construction is similar to that of the first embodiment and the same components as those of FIG. 1 are designated by the same reference numerals.

In the digital camera 1a, the filter 116 swings around the rotary shaft of the motor 117 as a center between a position on the optical axis of the lens system 111 (that is, on an optical path at the time of image capturing) and a position deviated from the optical path for image capturing. In the second embodiment, object-color component data corresponding to image data from which the influence of illuminance is removed and illuminant component data indicative of the influence of the illumination environment is obtained by using an image in the case where the filter 116 is positioned on the optical path for image capturing and an image in the case where the filter 116 is not positioned on the optical path for image capturing.

The CCD 112 is 3-band input image capturing means of acquiring values of R, G and B in a manner similar to the first embodiment. The digital camera 1a has an ordinary image capturing mode and a special image capturing mode. In the ordinary image capturing mode, image data consisting of values of R, G and B is obtained (that is, an operation similar to that of a commercially available digital camera is performed). In the special image capturing mode, the object-color component data and the illuminant component data are obtained.

Figure 16:
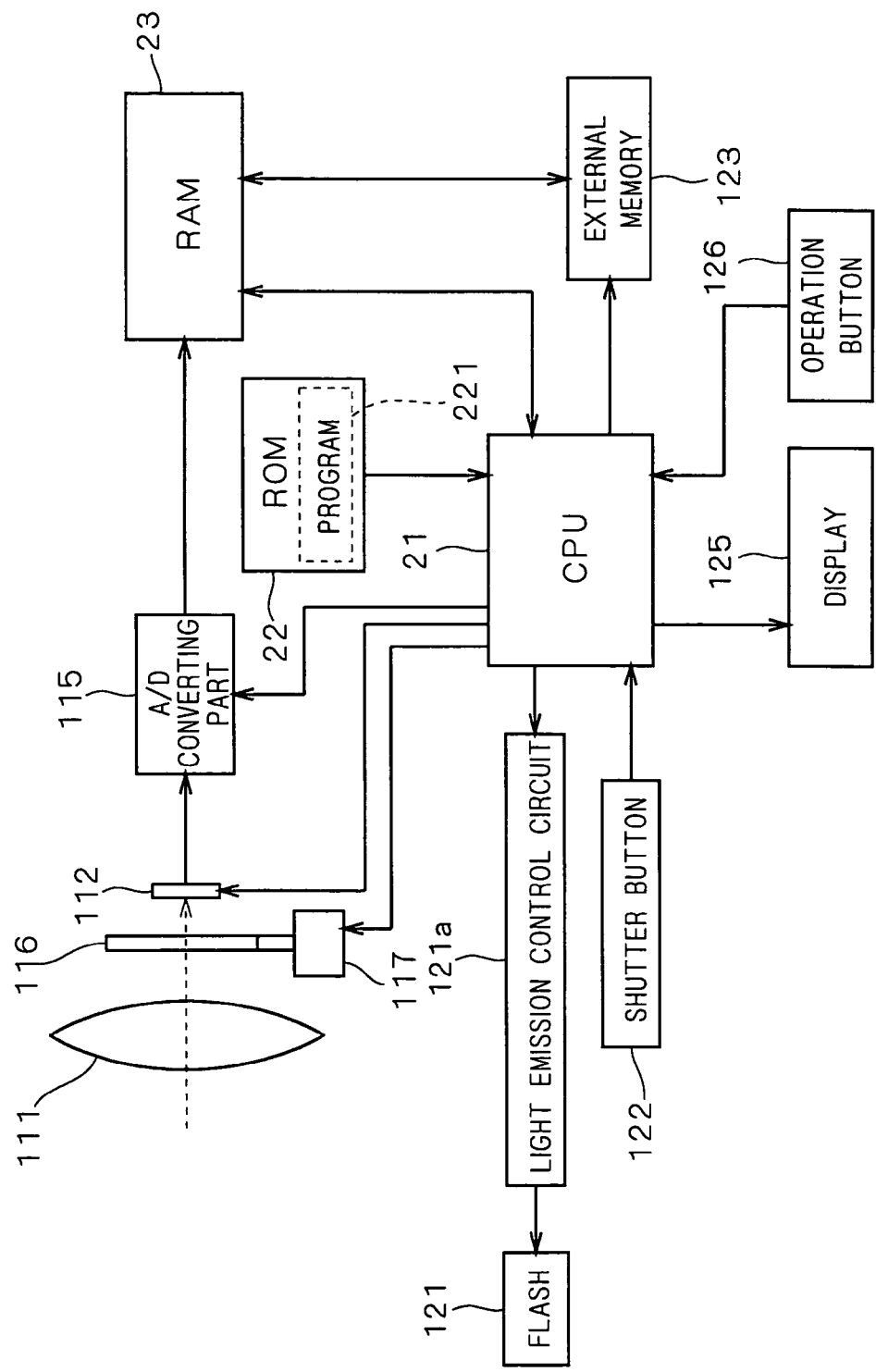
FIG. 16 is a block diagram showing the construction for executing an image process in the digital camera of FIG. 15.

FIG. 16 is a block diagram schematically showing the construction mainly for executing an image process in the construction of the digital camera 1a. Except for the point such that the filter 116 and the motor 117 are provided as shown in FIG. 16, the internal construction of the digital camera 1a is similar to that of the first embodiment. Processes performed by the CPU 21, the ROM 22, the RAM 23 and the like are different from those of the first embodiment and will be described in detail hereinlater. The flash 121 is used to perform the ordinary image capturing and is not used to perform the image capturing for obtaining the object-color component data and the like. The light emission control circuit 121a does not perform a light emitting control make the light emission characteristic uniform as in the first embodiment.

Figure 17:
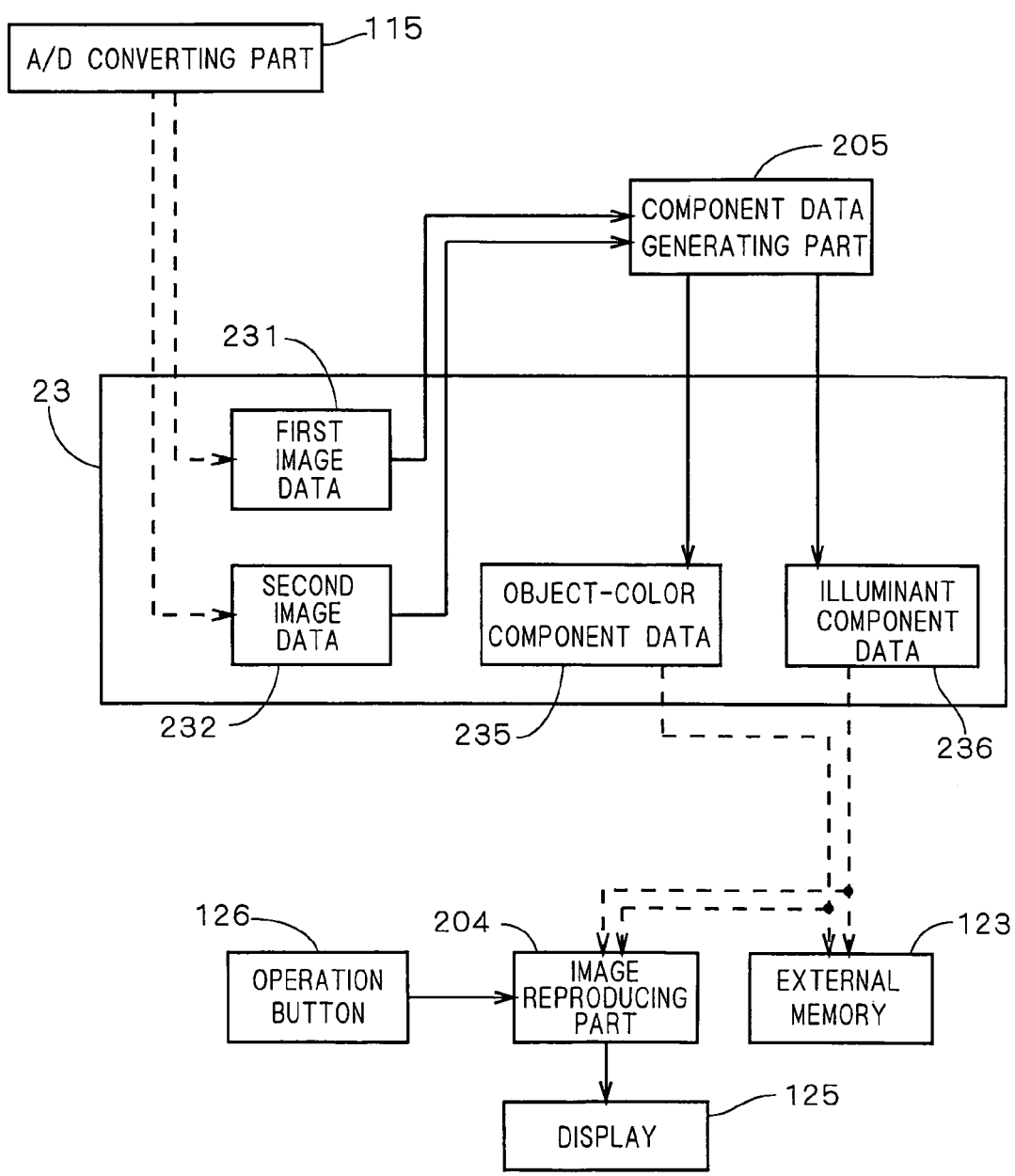
FIG. 17 is a block diagram showing the functions of the construction of FIG. 16.
Figure 18:
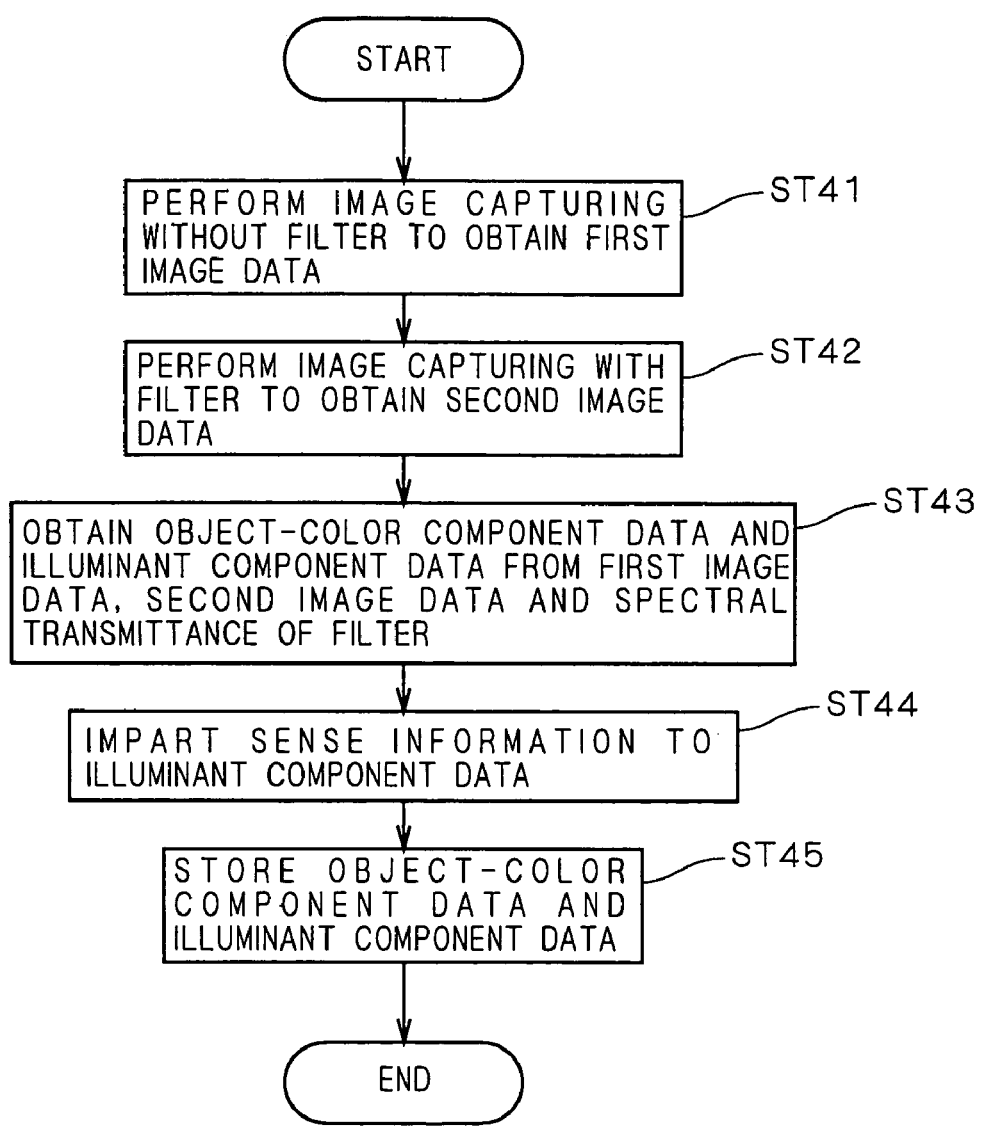
FIG. 18 is a flow chart showing a flow of operations for obtaining image data in the digital camera illustrated in FIG. 15.

FIG. 17 is a block diagram showing a component data generating part 205 for obtaining the object-color component data and the illuminant component data in the digital camera 1a in the special image capturing mode together with the peripheral construction. The component data generating part 205 is realized by the CPU 21, the ROM 22, the RAM 23 and the like. Specifically, the component data generating part 205 is a function realized by the operation of the CPU 21 while using the RAM 23 as a work area in accordance with the program 221 in the ROM 22. FIG. 18 is a flow chart showing the flow of operations of the digital camera 1a in the special image capturing mode.

In the special image capturing mode, first, an image is captured by setting the filter 116 in a position deviated from the image capturing optical path. Consequently, a first preliminary image which is a color image is stored as the first image data 231 into the RAM 23 via the A/D converting part 115 (step ST41).

The filter 116 is moved onto the image capturing optical path by the action of the motor 117 and an image is captured via the filter 116. Consequently, a second preliminary image which is a color image (of colors which are not actual colors of the subject since the filter 116 is used) is stored as the second image data 232 into the RAM 23 (step ST42). The operations in steps ST41 and ST 42 are promptly performed consecutively to capture images of the same subject.

After the first and second image data 231 and 232 are obtained, the object-color component data 235 corresponding to image data from which the influence of the illumination environment has been removed and the illuminant component data 236 indicative of the influence of the illumination environment are obtained by the component data generating part 205, and these data are stored into the RAM 23 (step ST43). The details of the processes of the component data generating part 205 will be described hereinlater.

After that, in a manner similar to the first embodiment, sense information is imparted to the illuminant component data 236 (step ST44) and the object-color component data 235 and the illuminant component data 236 are stored into the external memory 123 (step ST45).

The principle of the operation of the component data generating part 205 in step ST43 will now be explained.

As described above, in the case of expressing the spectral distribution $E(\lambda)$ of illumination light and the spectrum reflectivity $S(\lambda)$ in a position on the subject corresponding to a certain pixel (target pixel) by using three basis functions and weighting coefficients as shown in the equations (1) and (2), light $I(\lambda)$ entering the digital camera 1a from the position on the subject corresponding to the target pixel is expressed by the equation (3). When the spectral sensitivities corresponding to the R, G and B colors on the CCD 112 are set as $R_r(\lambda)$, $R_g(\lambda)$ and $R_b(\lambda)$, respectively, the R, G and B values $\rho_r$, $\rho_g$ and $\rho_b$ of a target pixel are obtained by the equation (6) in a manner similar to the equation (4).

$$\rho_r = \int R_r(\lambda) \sum_{i=1}^{3} \varepsilon_i E_i(\lambda) \cdot \sum_{j=1}^{3} \sigma_j S_j(\lambda) d\lambda \qquad (6)$$

$$= \sum_{i=1}^{3} \sum_{j=1}^{3} \varepsilon_i \sigma_j \left\{ \int R_r(\lambda) E_i(\lambda) S_j(\lambda) d\lambda \right\}$$

$$\rho_g = \int R_g(\lambda) \sum_{i=1}^{3} \varepsilon_i E_i(\lambda) \cdot \sum_{j=1}^{3} \sigma_j S_j(\lambda) d\lambda$$

$$= \sum_{i=1}^{3} \sum_{j=1}^{3} \varepsilon_i \sigma_j \left\{ \int R_g(\lambda) E_i(\lambda) S_j(\lambda) d\lambda \right\}$$

$$\rho_b = \int R_b(\lambda) \sum_{i=1}^{3} \varepsilon_i E_i(\lambda) \cdot \sum_{j=1}^{3} \sigma_j S_j(\lambda) d\lambda$$

$$= \sum_{i=1}^{3} \sum_{j=1}^{3} \varepsilon_i \sigma_j \left\{ \int R_b(\lambda) E_i(\lambda) S_j(\lambda) d\lambda \right\}$$

Vectors $\epsilon_v$ and $\sigma_v$ are defined as follows.

$\epsilon_v = {}^t(\epsilon_1, \epsilon_2, \epsilon_3)$ $$\sigma_v = {}^t(\sigma_1, \sigma_2, \sigma_3) \qquad (7)$$

When matrixes $S_r$, $S_g$ and $S_b$ each having elements i and j are defined by the following equations, $Sr(i,j) = \int R_r(\lambda) E_i(\lambda) S_j(\lambda) d\lambda$ $Sg(i,j) = \int R_g(\lambda) E_i(\lambda) S_j(\lambda) d\lambda$ $$Sb(i,j) = \int R_b(\lambda) E_i(\lambda) S_j(\lambda) d\lambda \qquad (8)$$

the values $\rho_r$, $\rho_g$ and $\rho_b$ are expressed as follows.

$\rho_r = {}^t\epsilon_v Sr \sigma_v$ $\rho_g = {}^t\epsilon_v Sg \sigma_v$ $$\rho_b = {}^t\epsilon_v Sb \sigma_v \qquad (9)$$

When a vector C is defined as follows, $$C = {}^t(\rho_r, \rho_g, \rho_b) \qquad (10)$$

the vector C is expressed in the following simplified form by using a function F indicating three equations (9).

$$C = F(\epsilon_v, \sigma_v) \quad (11)$$

From the pixel values of the first and second preliminary images with respect to the target pixel, six nonlinear equations expressed as follows are derived.

$$C_1 = F(\epsilon_{v1}, \sigma_v)$$

$$C_2 = F(\epsilon_{v2}, \sigma_v) \quad (12)$$

In the equations (12), the vector $C_1$ is a vector having elements of R, G and B values $\rho_{r1}$, $\rho_{g1}$ and $\rho_{b1}$ of the target pixel in the first preliminary image. The vector $C_2$ is a vector having elements of R, G and B values $\rho_{r2}$, $\rho_{g2}$ and $\rho_{b2}$ of the target pixel in the second preliminary image. A vector $\epsilon_{v1}$ is a vector having weighting coefficients $\epsilon_{11}$, $\epsilon_{12}$ and $\epsilon_{13}$ as elements in the case of expressing illumination light to the subject by using basis functions. A vector $\epsilon_{v2}$ is a vector having weighting coefficients $\epsilon_{21}$, $\epsilon_{22}$ and $\epsilon_{23}$ related to illumination light as elements when the second preliminary image captured through the filter 116 is regarded as an image of the subject irradiated with the illumination light, which is obtained through the filter 116. That is, in the equations (12), an image obtained through the filter 116 is regarded as an image of the subject irradiated with different illumination light.

Since the spectral distribution of virtual illumination light in the second preliminary image is obtained by multiplying the spectral distribution of actual illumination light by spectral transmittance of the filter 116, the vector $\epsilon_{v2}$ can be expressed by using the vector $\epsilon_{v1}$. In the six equations in the equations (12), only the six elements of the vectors $\epsilon_{v1}$ ad $\sigma_v$ are unknown.

Since the equation (11) has the term of $\epsilon_{pi}\sigma_j$ (p=1, 2), $\epsilon_{11}$ is fixed to a predetermined value and the remaining five unknown elements are obtained by the least square. That is, the vectors $\epsilon_{v1}$ and $\sigma_v$ by which the following value (13) becomes the minimum are obtained.

$$\sum_{p=1}^{2} \{C_p - F(\epsilon_{vp}, \sigma_v)\}^2 \quad (13)$$

By the method described above, the component data generating part 205 obtains the vectors $\epsilon_{v1}$ and $\sigma_v$ in each pixel from the first and second image data 231 and 232 while referring to the spectral transmittance of the filter 116. The data of the spectral transmittance of the filter 116 may be stored in the RAM 23 or a ROM in the component data generating part 205.

The vector $\sigma_v$ of each pixel is stored as the object-color component data 235 into the RAM 23. The average value of the elements of the vector $\epsilon_{v1}$ is calculated with respect to all the pixels and is stored as the illuminant component data 236 into the RAM 23 together with the sense information. In the case where the illuminant component data 236 is not demanded to have general versatility, the vector $\epsilon_{v1}$ of each pixel may be stored as it is.

In the method as described above, for example, in the case where the filter 116 is an ND filter having a uniform spectral transmittance in a waveband of visible light, the equations (12) cannot be solved. Therefore, the spectral transmittance of the filter 116 has to have the property such that the equation (12) can be solved. The spectral transmittance has to be nonuniform at least in the waveband of each of the R, G and B colors.

Figure 19:
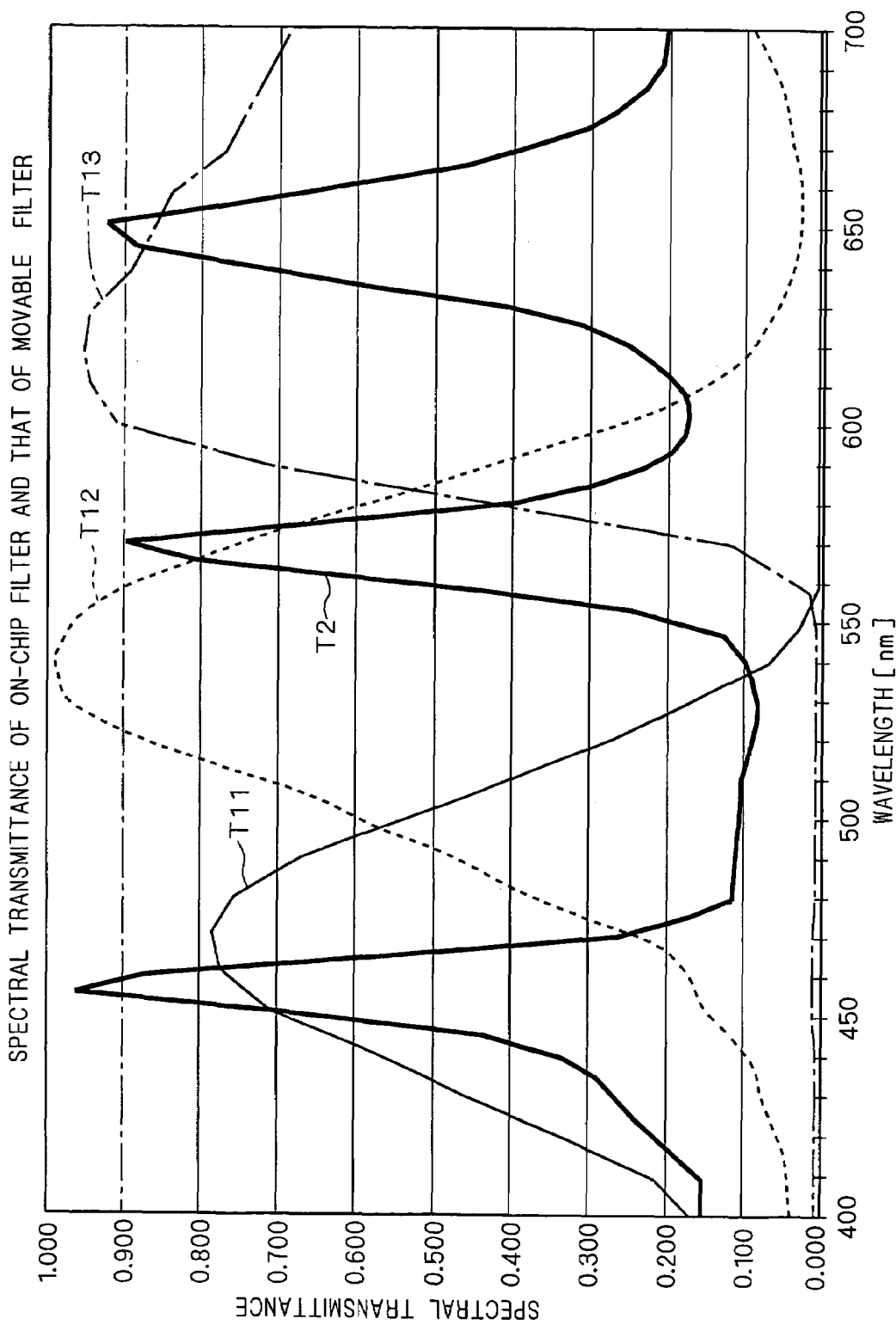
FIG. 19 is a diagram showing spectral transmittance of an on-chip filter on a CCD and that of a movable filter.

FIG. 19 shows an example of the spectral transmittance of the filter 116 satisfying such a condition. Reference numerals T11, T12 and T13 in FIG. 19 denote graphs of spectral transmittance of on-chip filters of R, G an B colors formed on photosensitive devices of the CCD 112. Reference numeral T2 denotes a graph of spectral transmittance of a movable filter 116.

A filter formed by stacking thin films on a glass substrate is used as the filter 116 and is designed so as to transmit light in a waveband slightly deviated from the center of the waveband of each color of the on-chip filter in the CCD 112. Consequently, when the filter 116 is disposed on the optical path for image capturing, the peak position of the spectral transmittance achieved by the filter 116 and the on-chip filter is deviated from that of the spectral transmittance of the on-chip filter.

Figure 20:
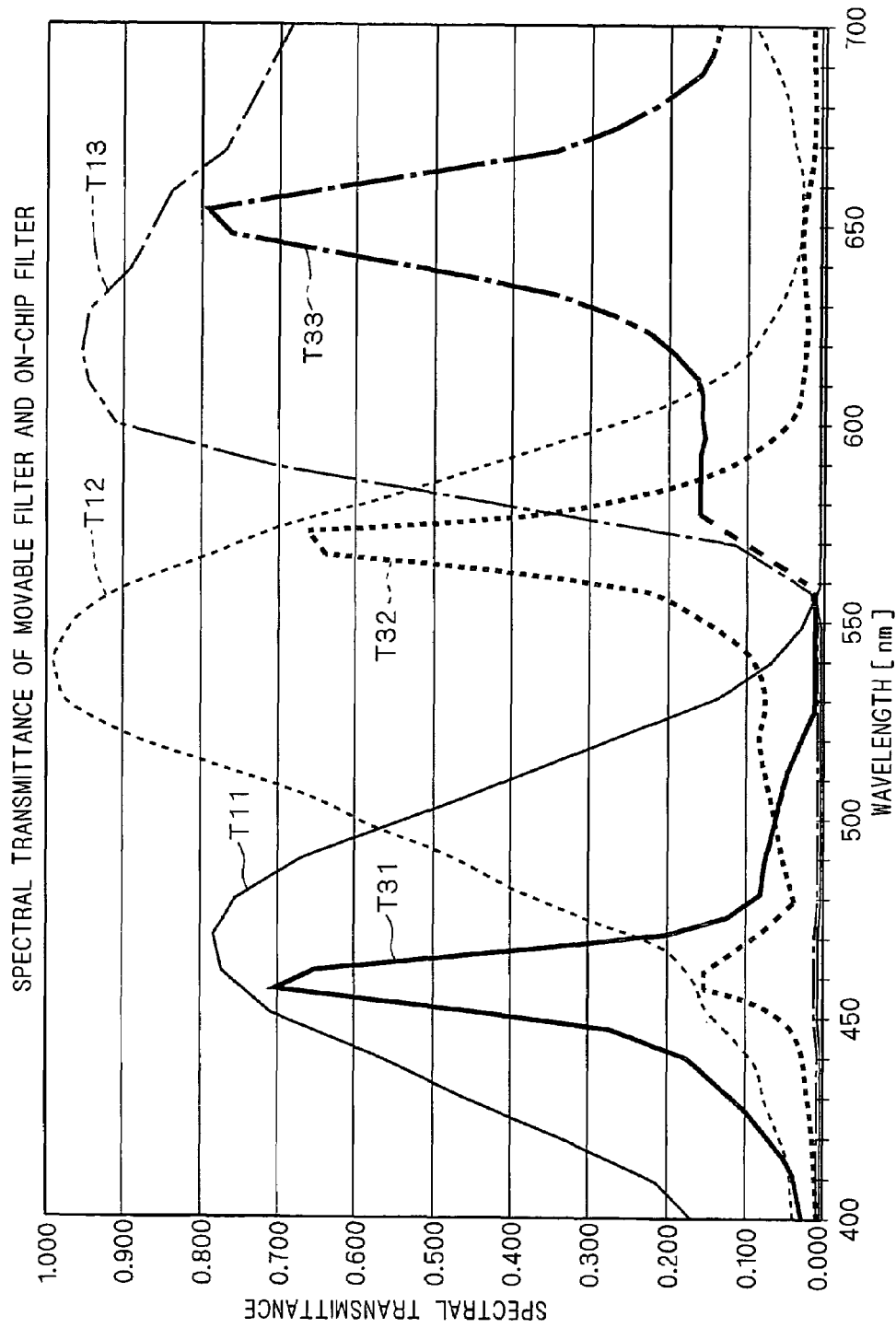
FIG. 20 is a diagram showing spectral transmittance in the case where light transmits both the on-chip filter on the CCD and the movable filter.

FIG. 20 is a graph showing spectral transmittances each obtained by multiplying the spectral transmittance of the on-chip filter of each of the R, G and B colors shown in FIG. 19 by the spectral transmittance of the movable filter 116. Reference numerals T31, T32 and T33 in FIG. 20 are graphs each showing the spectral transmittance in the case where light passes both the filter 116 and the on-chip filter of each of the R, G and B colors. As shown in FIG. 20, the peak position of the spectral transmittance (spectral sensitivity) of each of the R, G and B on-chip filters after the light passes through the filter 116 is deviated from that of the spectral transmittance of each of the R, G and B on-chip filters. Consequently, the object-color component data 235 and the illuminant component data 236 can be calculated from the first preliminary image obtained without the filter 116 and the second preliminary image obtained with the filter 116 by the component data generating part 205.

The construction and operation of the digital camera 1a according to the second embodiment have been described above. The digital camera 1a acquires the first preliminary image captured without the filter 116 and the second preliminary image captured with the filter 116 by providing the single movable filter 116, and obtains and stores the object-color component data 235 corresponding to image data of the subject obtained by removing the influence of the illuminance environment from the above images and the illuminant component data 236 indicative of the influence of the illumination environment. By performing a reproducing operation (refer to FIG. 9) similar to that of the first embodiment, therefore, a desired target image under a desired illumination environment can be reproduced.

In a manner similar to the first embodiment, by providing standard light (D65 or the like) as the illuminant component data 236, an image captured in an arbitrary illumination environment is reproduced by using the data of the standard light and accurate color reproduction of the target can be realized from the image. Further, by imparting the sense information 236a to the illuminant component data 236, reproduction of an image based on the sense can be enjoyed.

Although it has been described that the weighting coefficients $\sigma_1$, $\sigma_2$ and $\sigma_3$ corresponding to each pixel are stored as the object-color component data 235 and the weighting coefficients $\epsilon_1$, $\epsilon_2$ and $\epsilon_3$ common to each pixel (peculiar to each pixel in the case where general versatility is not required) are stored as the illuminant component data 236, the data may include a basis function of the spectrum reflectivity of the subject and a basis function of a spectral distribution of illumination light.

3. Third Embodiment

Figure 21:
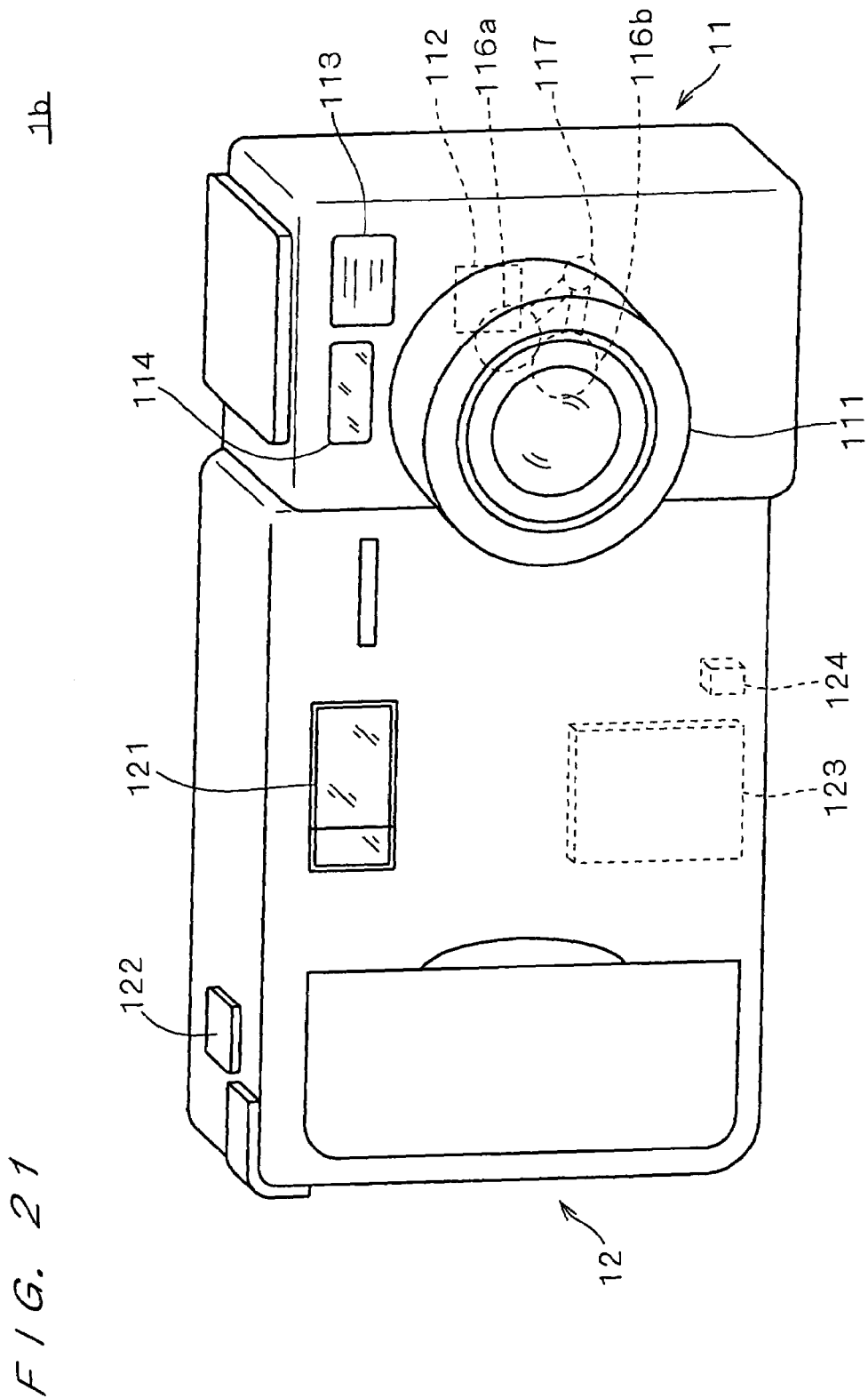
FIG. 21 is a perspective view showing a whole digital camera according to a third embodiment.

FIG. 21 shows the construction of a digital camera 1b according to the third embodiment. In the digital camera 1a according to the second embodiment, the single filter 116 can be disposed on the optical path for image capturing. The digital camera 1b according to the third embodiment is different from the digital camera 1a according to the second embodiment with respect to the point such that first and second filters 116a and 116b can be disposed on the optical path for image capturing by the operation of the motor 117. The internal construction of FIG. 21 is similar to that of FIG. 16 except for the point that the first and second filters 116a and 116b can be disposed on the optical path for image capturing. FIG. 16 will be referred to with respect to the construction other than the filters.

Figure 23:
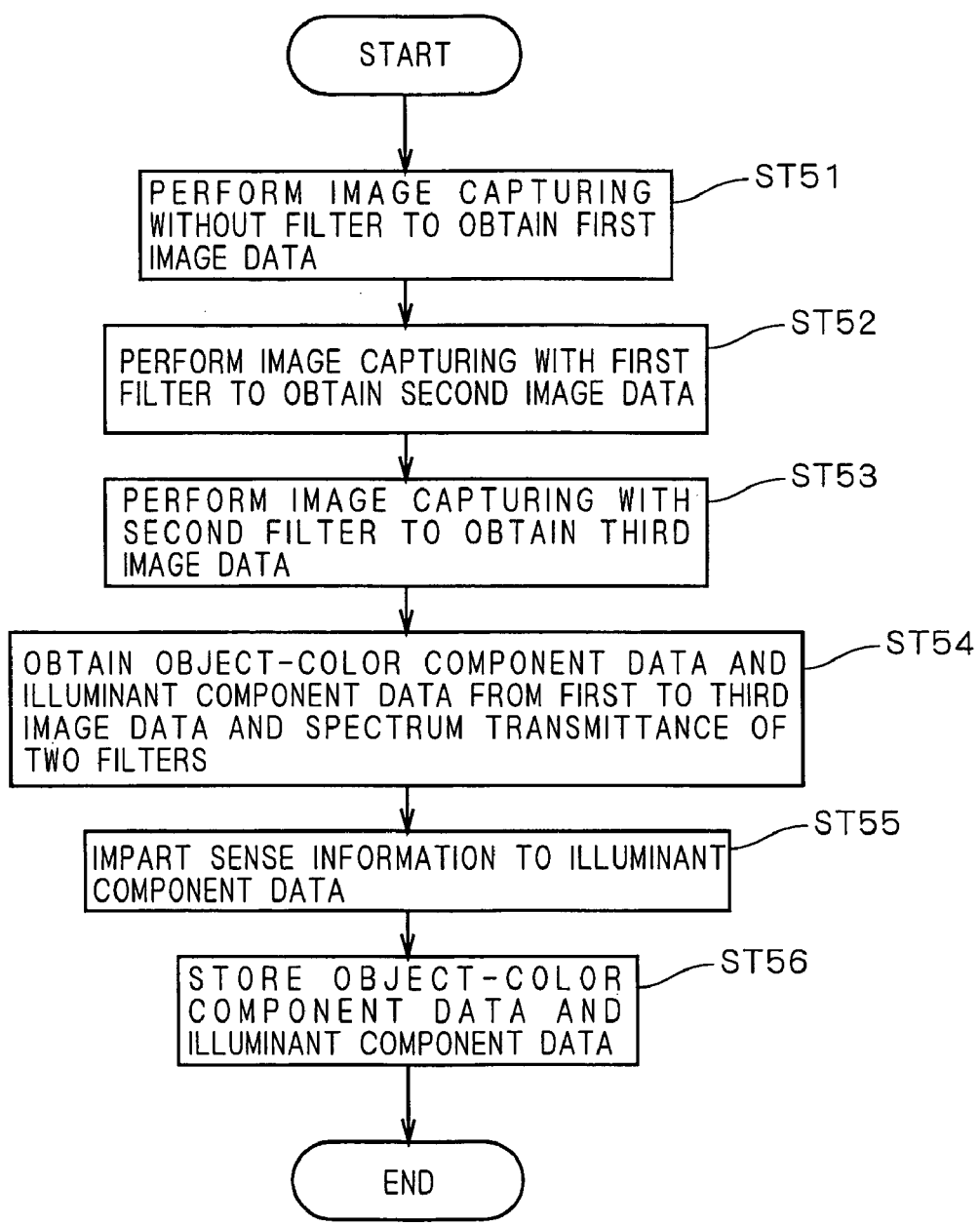
FIG. 23 is a flow chart showing a flow of operations for obtaining image data in the digital camera of FIG. 21.

FIG. 22 is a block diagram showing the component data generating part 205 realized by the CPU 21, the ROM 22, the RAM 23 and the like in the special image capturing mode for obtaining the object-color component data and the illuminant component data by the digital camera 1b together with the peripheral construction. As shown in FIG. 22, the third embodiment is different from the second embodiment with respect to the point that three image data 231, 232a and 232b are stored in the RAM 23 by the digital camera 1b. FIG. 23 is a flow chart showing the flow of operations of the digital camera 1b in the special image capturing mode.

In the operation of the digital camera 1b, first, a color image is captured without a filter as a first preliminary image and is stored as the first image data 231 into the RAM 23 (step ST51). Then the first filter 116a is moved onto the optical path for image capturing, and a second preliminary image is captured with the first filter 116a and is stored as the second image data 232a into the RAM 23 (step ST52). Further, the second filter 116b is moved onto the optical path for image capturing, and a third preliminary image is captured with the second filter 116b and is stored as the third image data 232b into the RAM 23 (step ST53). By the operations, the first to third image data 231, 232a and 232b are stored into the RAM 23. The image capturing operations of three times are performed sequentially and the subject of images is the same.

After that, the object-color component data 235 and the illuminant component data 236 are obtained from the three image data by the component data generating part 205 (step ST54). In a manner similar to the first embodiment, after imparting the sense information to the illuminant component data 236 (step ST55), the object-color component data 235 and the illuminant component data 236 are stored into the external memory 123 (step ST56).

The principle of obtaining the object-color component data 235 and the illuminant component data 236 by the component data generating part 205 in the digital camera 1b will now be described.

The vectors $C_1$, $C_2$ and $C_3$ of the pixel values (R, G and B values) in the target pixel in the first to third preliminary images are expressed by the following equations (14).

$$C_1 = F(\epsilon_{v1}, \sigma_v)$$

$$C_2 = F(\epsilon_{v2}, \sigma_v)$$

$$C_3 = F(\epsilon_{v3}, \sigma_v) \quad (14)$$

where, the vector $\epsilon_{v1}$ is a weighting coefficient vector of the basis function of illumination light in the case of using no filter, the vector $\epsilon_{v2}$ is a weighting coefficient vector of the basis function of virtual illumination light in the case of using the first filter, and the vector $\epsilon_{v3}$ is a weighting coefficient vector of the basis function of virtual illumination light in the case of using the second filter. That is, the second preliminary image is regarded as an image of the subject irradiated with illumination light through the first filter 116a and the third preliminary image is regarded as an image of the subject irradiated with illumination light through the second filter 116b. $\sigma_v$ is a weighting coefficient vector of the basis function of spectrum reflectivity in a position on the subject corresponding to the target pixel.

Since the vectors $\epsilon_{v2}$ and $\epsilon_{v3}$ are obtained from the vector $\epsilon_{v1}$ on the basis of the spectral transmittance of the first filter 116a and that of the second filter 116b, six elements of the vectors $\epsilon_{v1}$ and $\sigma_v$ are unknown in the nine equations in the equations (14). Consequently, the vectors $\epsilon_{v1}$ and $\sigma_v$ are obtained by using the least square so that the following becomes the minimum.

$$\sum_{p=1}^{3} \{C_p - F(\epsilon_{vp}, \sigma_v)\}^2 \quad (15)$$

In consideration of the fact that only six unknown elements exist, the vectors $\epsilon_{v1}$ and $\sigma_v$ are obtained within a predetermined retrieval range.

A specific example of the spectral transmittance of the first filter 116a and that of the second filter 116b will now be described. In a manner similar to the second embodiment, a filter having uniform spectral transmittance like an ND filter cannot be used as each of the first and second filters 116a and 116b. That is, a filter having spectral transmittance which is not uniform at least in the waveband of each of the R, G and B colors has to be used.

In the third embodiment, therefore, a filter having spectral transmittance shown by the reference numeral T2 in FIG. 19 is used as the first filter 116a, and a filter having spectral transmittance obtained by shifting the spectral transmittance of the first filter 116a only by about 50 nm (to either the shorter wavelength side or longer wavelength side) is used as the second filter 116b. By using the filters, a larger amount of information of narrower half width, which is less overlapped and more independent can be obtained, so that the accuracy of the object-color component data 235 and the illuminant component data 236 can be improved.

Although the object-color component data 235 and the illuminant component data 236 are obtained by using the three preliminary images in the above description, arithmetic operations similar to those in the second embodiment may be executed by using only the second and third preliminary images.

4. Fourth Embodiment

A digital camera according to a fourth embodiment has both the construction of the digital camera 1 according to the first embodiment and the construction of the digital camera 1a according to the second embodiment. The operations in the first and second embodiments are switched and performed.

Since the construction of the digital camera is similar to that shown in FIGS. 15 and 16, it will be described with reference to FIGS. 15 and 16. The light emission control circuit 121a shown in FIG. 16 is similar to the light emission control circuit in the first embodiment and plays the role of maintaining the light emitting characteristic of the flash 121 uniform.

Figure 24:
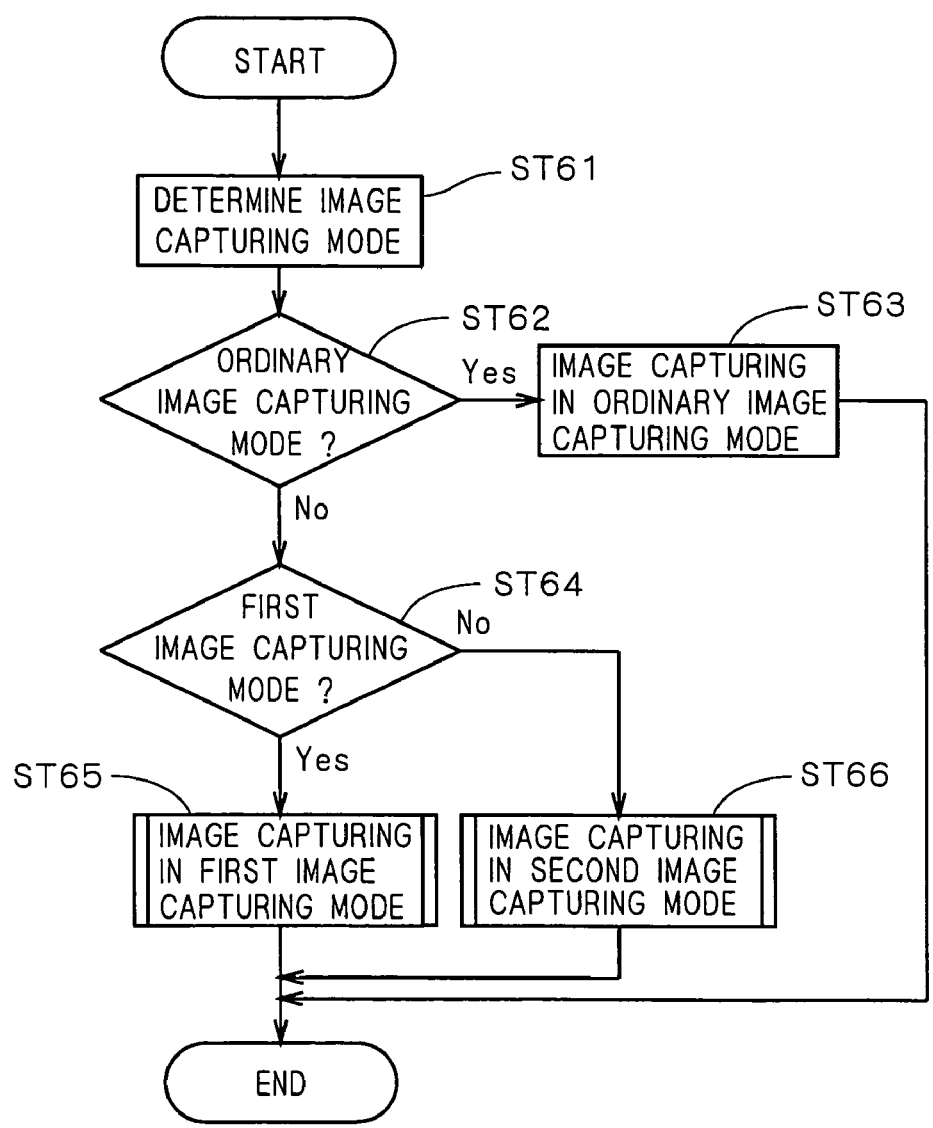
FIG. 24 is a flow chart showing a flow of the whole operations of a digital camera according to a fourth embodiment.

FIG. 24 is a flow chart showing the flow of operations of the digital camera according to the fourth embodiment. In image capturing, first, an image capturing mode is determined (step ST61). Image capturing modes include: an ordinary image capturing mode for capturing an image by the digital camera as an ordinary digital camera; a first image capturing mode for obtaining the object-color component data and the illuminant component data with/without the flash 121 in a manner similar to the first embodiment; and a second image capturing mode for obtaining the object-color component data and the illuminant component data depending on whether the filter 116 is disposed on the optical path for image capturing or not in a manner similar to the second embodiment. The image capturing mode may be determined manually or automatically as will be described hereinlater.

When the determination of the first or second image capturing mode is done manually, for example, in the case where the operator judges that the distance to the subject is long (that is, flash light does not reach), the operator selects the second image capturing mode. When the operator judges that the subject is not irradiated with sufficient light, the operator selects the first image capturing mode. There is no clear criterion of judgement. The operator properly determines the mode in consideration of the image capturing environment.

After the image capturing mode is determined, the digital camera captures an image in the selected image capturing mode. Specifically, in the case of the ordinary image capturing mode, an image is captured in an ordinary manner, and image data in which pixels values are expressed by R, G and B values is stored into the external memory 123 (steps ST62 and ST63). In the case of the first image capturing mode, the operations shown in FIG. 5 are performed and the object-color component data and the illuminant component data are stored into the external memory 123 (steps ST64 and ST65). In the case of the second image capturing mode, the operations shown in FIG. 18 are performed and the object-color component data and the illuminant component data are stored into the external memory 123 (steps ST64 and ST66).

As described above, in the digital camera according to the fourth embodiment, the image capturing mode can be selected according to the image capturing environment at the time of obtaining the object-color component data and the illuminant component data. As a result, the object-color component data and the illuminant component data can be properly obtained.

A method of automatically determining either the first image capturing mode or the second image capturing mode will now be described. It is assumed that whether the ordinary image capturing mode is selected or not is set manually.

Figure 25:
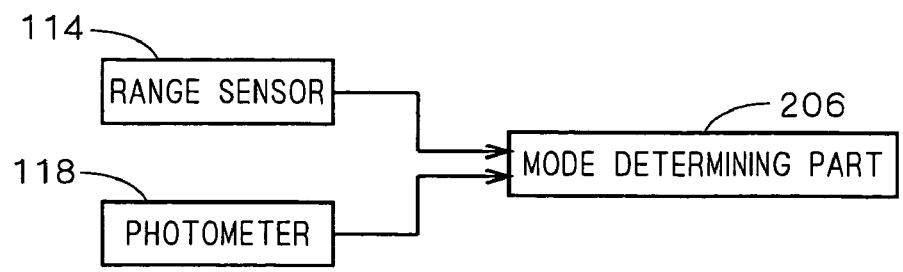
FIG. 25 is a block diagram showing the construction in the case of automatically switching an image capturing mode.

FIG. 25 is a block diagram showing the construction of automatically determining the first or second image capturing mode. The image capturing mode is determined by a mode determining part 206. A distance to the subject is inputted from the range sensor 114 to the mode determining part 206 and brightness of the subject is inputted from a photometer 118. As shown in FIG. 15, the range sensor 114 is disposed in the upper part of the front face of the lens unit 11, and the photometer 118 is also disposed in the window in which the range sensor 114 is disposed. The function of the photometer 118 may be realized by the CCD 112.

The mode determining part 206 shown in FIG. 25 is a part of the functions realized by the CPU 21, the ROM 22, the RAM 23 and the like. The operation of the mode determining part 206 is realized in such a manner that signals from the range sensor 114 and the photometer 118 are supplied to the CPU 21 and the CPU 21 performs an arithmetic operation in accordance with the program 221 in the ROM 22.

When the distance to the subject is equal to or shorter than a predetermined distance, the mode determining part 206 selects the first image capturing mode. When the distance to the subject is longer than the predetermined distance, the mode determining part 206 selects the second image capturing mode. When the distance to the subject exceeds the predetermined distance and the brightness of the subject is lower than predetermined brightness, the operator is notified through the display 125 that the image capturing cannot be performed properly. In this case, the operator forcedly determines an image capturing mode.

By the automatic selection between the first and second image capturing modes by the mode determining part 206 as described above, the object-color component data and the illuminant component data can be properly obtained according to the image capturing environment.

5. Fifth Embodiment

In the digital camera 1 according to the first embodiment, the light emitting characteristic of the flash 121 is maintained uniform by the light emission control circuit 121a to thereby make the spectral distribution of flash light uniform. Consequently, the object-color component data can be stably obtained. In the fifth embodiment as a modification of the first embodiment, a method of obtaining a relative spectral distribution of flash light by monitoring the light emitting state of the flash light and obtaining the object-color component data and the illuminant component data on the basis of the obtained distribution will be described. Since the main construction of the digital camera is similar to that in FIGS. 1 and 2, the drawings will be referred to.

Figure 26:
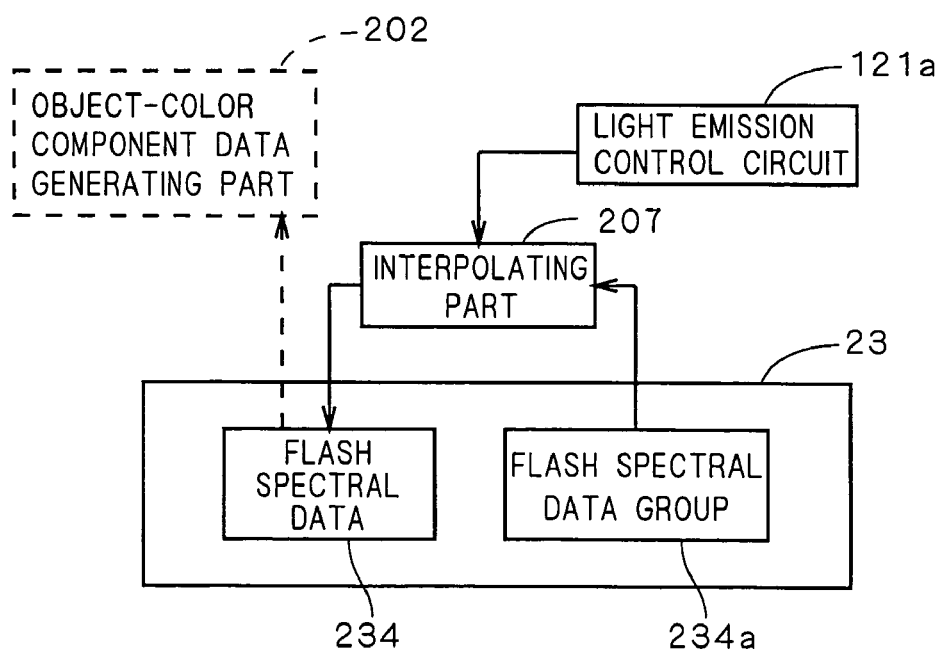
FIG. 26 is a block diagram showing the construction for obtaining a relative spectral distribution of flash light by interpolating a group of flash spectral data.

FIG. 26 shows the construction of obtaining the relative spectral distribution of flash light (that is, the flash spectral data 234 in FIG. 4) in the digital camera according to the fifth embodiment and mainly illustrates the part different from the construction of FIG. 4. A flash spectral data group 234a in the RAM 23 shown in FIG. 26 is a group of data indicative of the relative spectral distributions of flash light under a plurality of representative light emitting conditions. Representative light emitting conditions of total four kinds are such that, for example, a charging voltage is 330V or 250V and light emitting time is 1 or 1/32 (it is assumed that the longest light emitting time is 1). FIG. 27 shows a part of an example of the flash spectral data group 234a. The solid graph having solid rhombuses indicates a relative spectral distribution of flash light in the case where the charging voltage is 330V and the light emitting time is 1. The solid line having blank triangles indicates a relative spectral distribution of flash light in the case where the charging voltage is 330V and the light emitting time is 1/32.

In the digital camera according to the fifth embodiment, the light emission control circuit 121a does not have the function of maintaining the light emitting characteristic of the flash 121 uniform as in the first embodiment. The light emission control circuit 121a controls the light emission of the flash 121 so as to achieve a proper light emitting amount on the basis of information from the range sensor 114 and the photometer 1118. In this case, the light emitting state of the flash 121 is monitored.

An interpolating part 207 is a function realized by the CPU 21, the ROM 22, the RAM 23 and the like and interpolates the data in the flash spectral data group 234a on the basis of the light emitting state monitored by the light emission control circuit 121a, thereby generating the flash spectral data 234.

Figure 28:
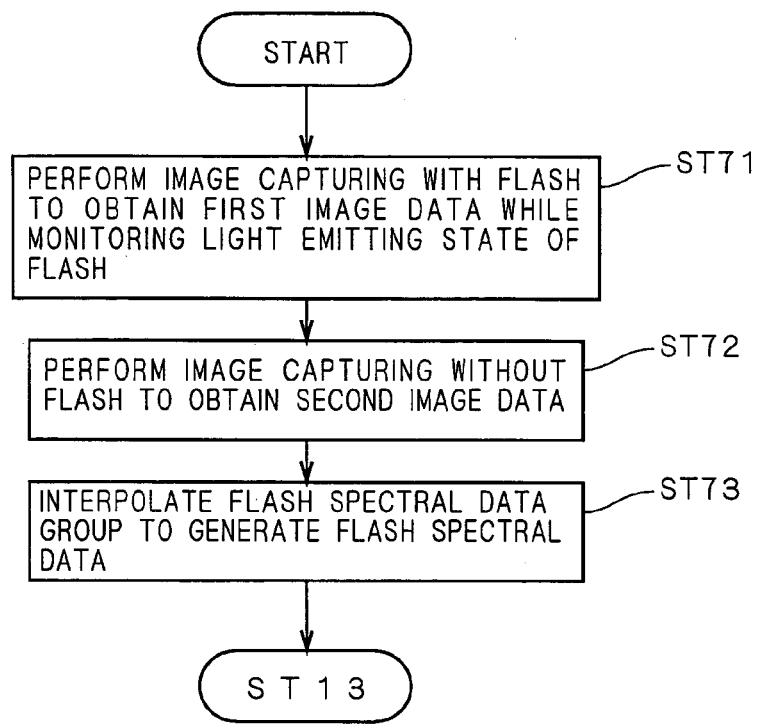
FIG. 28 is a flow chart showing a flow of operations for obtaining image data in a fifth embodiment.

FIG. 28 is a flow chart showing the flow of operations of the digital camera at the time of image capturing. Operations subsequent to step ST73 are similar to those subsequent to step ST13 in FIG. 5.

First, an image capturing operation is performed with the flash 121 and a first image is stored as the first image data 231 into the RAM 23 (step ST71). At this time, the light emission control circuit 121a monitors the light emitting state of the flash 121, and the charging voltage supplied to the power source of the flash 121 at the time of light emission and the light emission time of the flash 121 are sent to the interpolating part 207. Subsequently, a second image is captured without the flash 121 and is stored as the second image data 232 into the RAM 23 (step ST72).

After the two image data is obtained, the data in the flash spectral data group 234a is interpolated by the interpolating part 207 on the basis of the light emitting state of the flash 121, and the relative spectral distribution of flash light is obtained as the flash spectral data 234 and stored into the RAM 23 (step ST73).

For example, when the charging voltage at the time of light emission of the flash 121 is 330V and the light emission time is ½, the graph of the charging voltage of 330 V and the light emission time of 1 and the graph of the charging voltage of 330V and the light emission time of 1/32 are interpolated by using the light emission time as a reference and the broken-line graph having blank squares is obtained as a relative spectral distribution of flash light in the case where the charging voltage is 330V and the light emission time is ½. Interpolation such as linear interpolation, linear interpolation after weighting, or non-linear interpolation is carried out.

The flash spectral data 234 may be calculated either at the stage of step ST71 or the stage of step ST14 (FIG. 5).

After that, in a manner similar to the first embodiment, the object-color component data 235 and the illuminant component data 236 are obtained and stored into the external memory 123 (steps ST13 to ST17).

The digital camera according to the fifth embodiment has been described above. In the digital camera, the light emitting state of the flash 121 is monitored, and the flash spectral data group 234a is interpolated in accordance with the light emitting state (that is, actual light emitting conditions), thereby obtaining the flash spectral data 234. Consequently, while properly using the flash 121 in accordance with the image capturing environment, the object-color component data 235 and the illuminant component data 236 can be properly acquired.

At the time of obtaining the flash spectral data 234, the data in the flash spectral data group 234a is interpolated. The quantity of the flash spectral data group 234a to be prepared can be therefore reduced.

6. Sixth Embodiment

In the fifth embodiment, by interpolating the relative spectral distributions of flash light under the representative light emitting conditions, the relative spectral distribution of actual flash light is obtained. In the sixth embodiment, a method of preparing a database of the relative spectral distributions of flash light under more detailed light emitting conditions and determining the relative spectral distribution of flash light from the light emission state of the flash 121 will be described.

Figure 29:
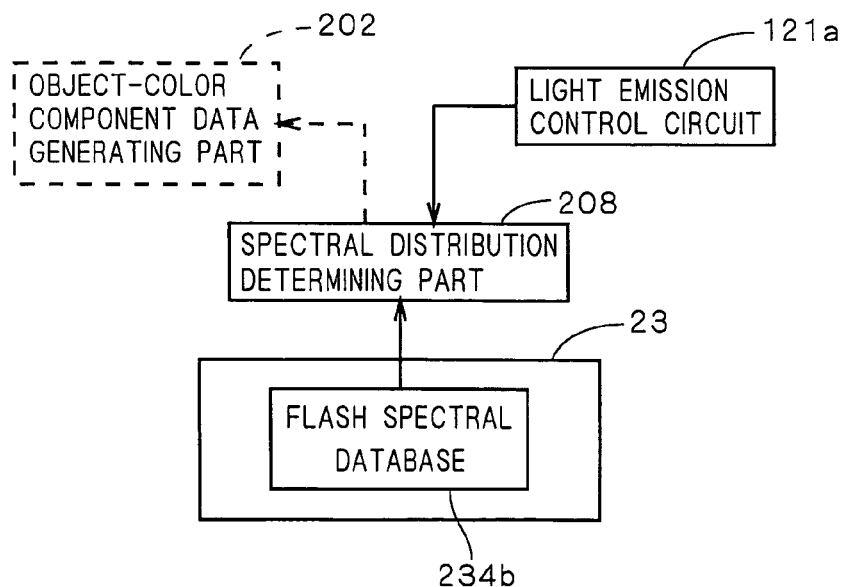
FIG. 29 is a block diagram showing the construction of determining a relative spectral distribution of flash light by referring to a database.

FIG. 29 shows the construction for determining the relative spectral distribution of flash light and corresponds to FIG. 26 in the fifth embodiment. The other construction is similar to that of the fifth embodiment, and the reference numerals shown in FIGS. 1 to 4 will be properly referred to.

A flash spectral database 234b in FIG. 29 is a database of relative spectral distributions of flash light under various light emission conditions. Table 1 shows an example of the flash spectral database 234b.

TABLE 1

| | charging voltage[v] | light emission time | wavelength[nm] | | | | | |
|---|---|---|---|---|---|---|---|---|
| | | | 400 | 420 | 440 | 460 | 680 | 700 |
| 1 | 330 | 1 | 0.1 | 0.2 | 0.4 | 0.5 | 0.7 | 0.65 |
| 2 | 330 | ½ | 0.1 | 0.22 | 0.43 | 0.55 | 0.68 | 0.62 |
| 3 | 330 | ¼ | 0.1 | 0.23 | 0.44 | 0.57 | 0.65 | 0.61 |
| 4 | 330 | ⅛ | 0.13 | 0.26 | 0.48 | 0.59 | 0.63 | 0.6 |
| 21 | 290 | 1 | 0.1 | 0.3 | 0.45 | 0.57 | 0.7 | 0.65 |
| 22 | 290 | ½ | 0.1 | 0.31 | 0.48 | 0.59 | 0.71 | 0.68 |
| 23 | 290 | ¼ | 0.1 | 0.33 | 0.51 | 0.6 | 0.76 | 0.73 |
| 24 | 290 | ⅛ | 0.1 | 0.35 | 0.55 | 0.63 | 0.78 | 0.7 |
| 41 | 250 | 1 | 0.1 | 0.33 | 0.58 | 0.54 | 0.68 | 0.62 |
| 42 | 250 | ½ | 0.1 | 0.35 | 0.6 | 0.53 | 0.69 | 0.6 |

Table 1 shows the flash spectral database 234b including relative spectral distributions of flash light in various combinations of the charging voltage to the power source of the flash 121 and the light emission time.

A spectral distribution determining part 208 is a function realized by the CPU 21, the ROM 22, the RAM 23 and the like and determines the most proper relative spectral distribution of flash light from the flash spectral database 234b on the basis of the light emitting state of the flash 121 received from the light emission control circuit 121a.

For example, when the charging voltage is 325V and the light emission time is ⅕, the relative spectral distribution of flash light with the charging voltage of 330V and the light emission time of ¼ as the closest light emission conditions is determined as an actual relative spectral distribution.

Figure 30:
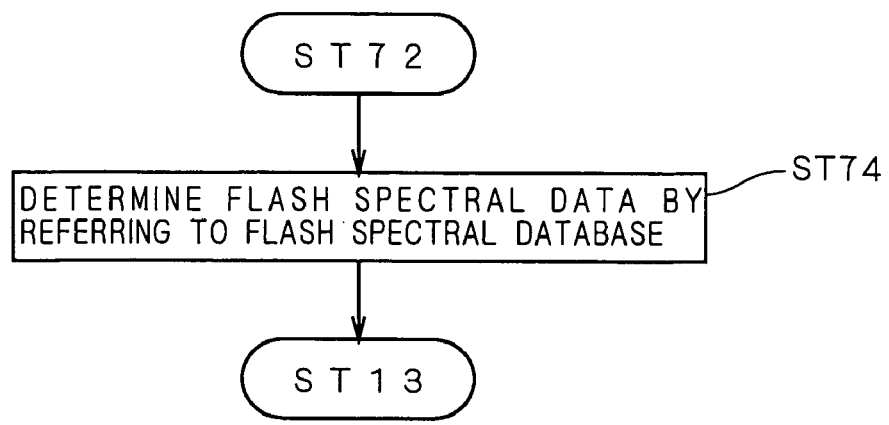
FIG. 30 is a flow chart showing a flow of operations for obtaining image data in a sixth embodiment.

The operation of the digital camera in the sixth embodiment is almost similar to that of the digital camera in the fifth embodiment. In the sixth embodiment, step ST73 in FIG. 28 is replaced by step ST74 in FIG. 30. That is, first, while monitoring the light emitting state of the flash 121, the first image data 231 is obtained with the flash 121 (step ST71) and then the second image data 232 is obtained without the flash 121 (step ST72).

After obtaining two images, the spectral distribution determining part 208 extracts the optimum relative spectral distribution from the flash spectral database 234b on the basis of the light emitting state monitored by the light emission control circuit 121a (step ST74). In such a manner, data corresponding to the flash spectral data 234 in the first embodiment is supplied to the object-color component data generating part 202.

Subsequent to step ST74, operations similar to those subsequent to step ST13 in the first embodiment are performed, so that the object-color component data 235 and the illuminant component data 236 are obtained and stored into the external memory 123 (steps ST13 to ST17).

The digital camera according to the sixth embodiment has been described above. In the digital camera, the relative spectral distribution of flash light used for an arithmetic operation is determined by referring to the flash spectral database 234b. Consequently, even in the case where the operation of the flash 121 is not controlled fixedly, the relative spectral distribution of flash light can be promptly determined.

7. Seventh Embodiment

Figure 31:
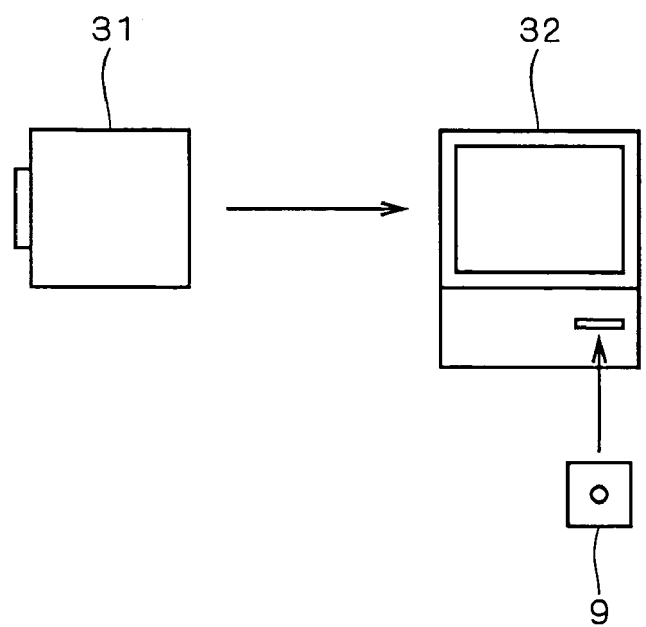
FIG. 31 is a diagram showing the construction of an image data obtaining system in a seventh embodiment.

Although image data is processed in the digital camera in the foregoing embodiments, obviously, it can be performed by a computer. FIG. 31 shows the construction of an image data obtaining system 3 in such a case.

The image data obtaining system 3 comprises: a digital camera 31 for storing image data acquired by the CCD as it is into an external memory; and a computer 32 for processing the image data stored in the external memory to thereby obtain the object-color component data and the illuminant component data. Such a construction can be used for any of the operations in the first to sixth embodiments.

For example, in the case of using the image data obtaining system 3 shown in FIG. 31 for the processes of the first embodiment, the digital camera 31 having the construction shown in FIG. 3 is used, the first image data obtained by performing image capturing with a flash, the second image data obtained by performing image capturing without a flash, and flash spectral data related to flash light is stored into the external memory 123, and those data is transferred via the external memory 123 to the computer 32.

The CPU, ROM, RAM and the like in the computer 32 function as the differential image generating part 201, the object-color component data generating part 202 and the illuminant component data generating part 203 shown in FIG. 4 to calculate the object-color component data corresponding to image data obtained by removing the influence of the illumination environment from the first image data, the second image data and the flash spectral data and the illuminant component data corresponding to the components of the illumination environment.

In this case, it is unnecessary for the digital camera 31 to have the function of obtaining the object-color component data and the illuminant component data.

In the case of using the image data obtaining system 3 for the processes in the second embodiment, the digital camera 31 having the construction shown in FIG. 16 is used. The first image data obtained by performing the image capturing without the filter, the second image data obtained by performing the image capturing with the filter, and the data of the spectral transmittance of the filter 116 is stored in the external memory 123 and those data is transferred to the computer 32.

The CPU, ROM, RAM and the like in the computer 32 function as the component data generating part 205 shown in FIG. 17, and calculate the object-color component data and the illuminant component data from the first image data, the second image data and the spectral transmittance of the filter 116. By prestoring the spectral transmittance of the filter 116 in the computer 32, it can be arranged to transfer only the first image data and the second image data from the digital camera 31.

In this case as well, the function of obtaining the object-color component data and the illuminant component data is unnecessary in the digital camera 31.

In order to make the computer 32 function as the differential image generating part 201, the object color component data generating part 202 and the illuminating component data generating part 203 shown in FIG. 4 or the component data generating part 205 shown in FIG. 17, a program is preliminarily installed into the computer 32 via a recording medium 9 such as a magnetic disk, an optical disk, a magnetooptic disk, or the like. Consequently, a general computer 32 can be used as the computer for performing the image process.

Figure 9:
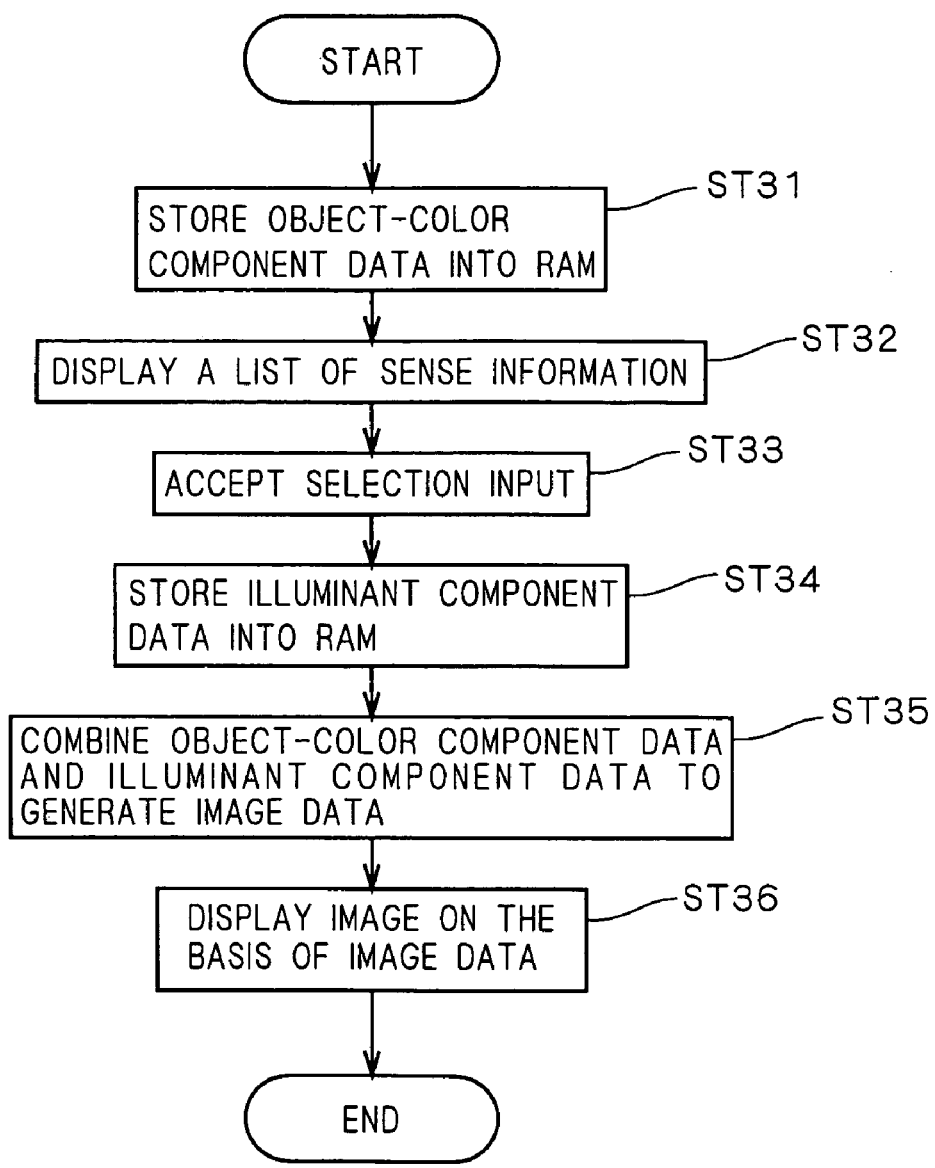
FIG. 9 is a flow chart showing a flow of operations for reproducing an image in the digital camera illustrated in FIG. 1.

The operation for reproducing an image shown in FIG. 9 can be realized by the computer 32 by installing a program for a reproducing operation into the computer 32.

As described above, the digital camera according to any one of the first to sixth embodiments can be used in the image data obtaining system 3 comprised of the digital camera 31 and the computer 32. In this case, an amount of processes to be performed by the digital camera 31 can be reduced.

8. Modification

Although the embodiments have been described above, the embodiments can be variously modified.

For example, any illuminant component data in the foregoing embodiments can be used as long as data indicates an influence of the illumination environment on an image. The illuminant component data is not strictly required to indicate the influence of the illumination environment but may indicate the influence of the illumination environment to some extent. Any data indicative of the components obtained by removing the influence of the illumination environment from an image can be used as the object-color component data. The data does not always have to indicate the components obtained by strictly removing the influence of the illumination environment from an image.

Although it has been described in the foregoing embodiments that the object-color component data and the illuminant component data is stored as a plurality of weighting coefficients, other formats of storing the data may be also employed. For example, the object-color component data may be stored as a characteristic curve of spectrum reflectivity and the illuminant component data may be stored as a characteristic curve of a spectral distribution.

It is not always necessary to use the digital camera 1 or the image data obtaining system 3 to obtain the illuminant component data. For example, illuminant component data intended for virtual illumination may be generated separately. Further, the illuminant component data used at the time of reproducing an image may be generated by combining a plurality of illuminant component data.

Figure 32:
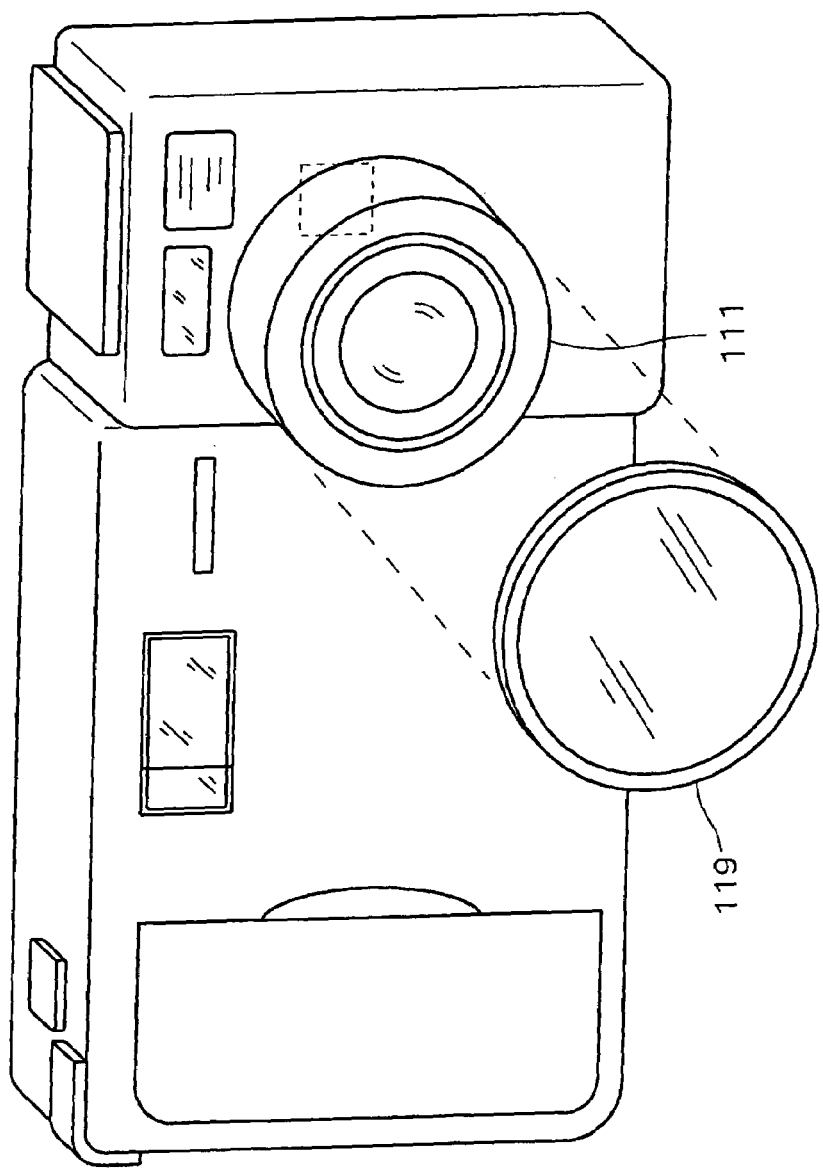
FIG. 32 is a diagram showing a modification of the digital camera of FIG. 15.

Although it has been described that a movable filter is provided in the digital camera in each of the second to fourth embodiments, the filter may be disposed on the optical path for image capturing by the operator. For example, as shown in FIG. 32, it is also possible to prepare an attachable filter 119 having spectral transmittance similar to that of the filter 116 in front of the lens system 111 and to obtain a plurality of preliminary images by attaching and detaching the filter 119 by the operator. In this case, in order to make the subject the same in the plurality of preliminary images, the digital camera is fixed. When the filter is attached/detached manually in the fourth embodiment, by the selection of the second image capturing mode, the digital camera notifies the operator that the filter 116 has to be attached by using the display 125 or an alarm and it is controlled so that the shutter is not released unless the filter is attached.

Although the single filter 116 is used in the second embodiment and the two filters 116a and 116b are used in the third embodiment, three or more filters may be also used. That is, if at least one filter can be disposed on the optical path for image capturing, by obtaining a plurality of image data while changing the disposing state of the filter on the optical path for image capturing, the object-color component data and the illuminant component data can be obtained.

The method of obtaining the object-color component data and the illumination component data in the second to fourth embodiments are not limited to the foregoing embodiments but other methods may be employed.

Although the light emission characteristics of the flash 121 are kept uniform by monitoring the charging voltage and the light emission time in the first embodiment, the light emission characteristics of the flash 121 may be kept uniform by other methods. For example, by emitting the flash 121 in pulses, the light emission characteristics of the flash may be kept uniform.

Although the light emission control circuit 121a monitors the charging voltage and the light emission time in the first, fourth and sixth embodiments, if the spectral characteristics of the flash 121 can be kept uniform or the spectral characteristics can be determined, other light emitting states (light emitting conditions) can be monitored.

Although the flash 121 functions as means for changing the illumination environment of the subject in the first, fourth and six embodiments, the method of changing the illumination environment is not limited to the method of using the flash 121.

In the embodiments, it has been described that the CCD 112 has three band inputs of R, G and B. However, the number of input bands may be four or more. That is, when an image obtained by the CCD 112 (which may be what is called a 3 CCD) substantially corresponds to a color image, the object-color component data and the illumination component data can be obtained by the above-described method.

While the invention has been shown and described in detail, the foregoing description is in all aspects illustrative and not restrictive. It is therefore understood that numerous modifications and variations can be devised without departing from the scope of the invention.

What is claimed is:

1. An image capturing apparatus comprising:
    an illuminator for changing an illumination environment around a subject, wherein the illuminator has a light emitting part emitting light to said subject;
    an image sensor for obtaining an image of said subject;
    a first memory for memorizing first image data obtained by said image sensor with illuminating by said illuminator;
    a second memory for memorizing second image data obtained by said image sensor without illuminating by said illuminator;
    a difference data calculator for calculating difference data between said first image data memorized in said first memory and said second image data memorized in said second;
    a spectral reflectivity calculator for calculating spectral reflectivity of said subject based on the difference data and relative spectral distribution of light from said light emitting part to obtain subject data; and
    an illumination data calculator for calculating illumination data on the basis of the second image data and said subject data, wherein said illumination data indicates influence of an illumination environment on the second image data.

2. The apparatus of claim 1, further comprising
    a controller for controlling lighting of said light emitting part to keep spectral distribution of light from said light emitting part constant.

3. The apparatus of claim 1, further comprising:
    a third memory for memorizing a plurality of illumination data each of which is different from one another;
    a selector for selecting any one of said plurality of illumination data; and
    a reproducer for reproducing a subject image on the basis of illumination data selected by said selector and said subject data.

4. The apparatus of claim 3, wherein
    each of said plurality of illumination data is given sense information which represents a sense given to an observer observing an image influenced by a corresponding illumination environment, and
    said selector displays a plurality of pieces of sense information.

5. A method of shooting a subject by an image capturing apparatus which has a light emitting part emitting light to said subject, said method comprising the steps of:
    obtaining first image data by shooting said subject with an image sensor under irradiation of light from said light emitting part;
    obtaining second image data by shooting said subject with said image sensor without irradiation of light from said light emitting part;
    calculating difference data between said first image data and said second image data; and
    calculating spectral reflectivity of said subject based on the difference data and relative spectral distribution of light from said light emitting part to obtain subject; and
    calculating illumination data on the basis of the second image data and said subject data, wherein said illumination data indicating influence of said illumination environment on the second image data.

* * * * *